(12) United States Patent
Cosimini et al.

(10) Patent No.: US 10,432,542 B2
(45) Date of Patent: Oct. 1, 2019

(54) TELECOMMUNICATION NETWORK CONFIGURED TO CONTROL NETWORK COMMUNICATION ROUTES

(71) Applicant: VODAFONE IP LICENSING LIMITED, Newbury, Berkshire (GB)

(72) Inventors: Peter Cosimini, Newbury (GB); Peter Howard, Newbury (GB); Steven Allen, Newbury (GB); David Fox, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 14/398,943

(22) PCT Filed: May 3, 2013

(86) PCT No.: PCT/EP2013/059309
§ 371 (c)(1),
(2) Date: Nov. 4, 2014

(87) PCT Pub. No.: WO2013/164474
PCT Pub. Date: Nov. 7, 2013

(65) Prior Publication Data
US 2015/0140983 A1    May 21, 2015

(30) Foreign Application Priority Data

May 4, 2012 (GB) .................................. 1207816.8

(51) Int. Cl.
*H04W 4/00* (2018.01)
*H04W 72/04* (2009.01)
(Continued)

(52) U.S. Cl.
CPC ........... *H04L 47/2475* (2013.01); *H04W 4/50* (2018.02); *H04W 12/10* (2013.01);
(Continued)

(58) Field of Classification Search
CPC ............ H04L 12/1485; H04L 12/1435; H04L 47/2475; H04L 12/859; H04L 67/00;
(Continued)

(56) References Cited

U.S. PATENT DOCUMENTS 6,643,682 B1 * 11/2003 Todd ....................... G06F 9/542
709/202
7,103,680 B1 * 9/2006 Holdsworth ...... G06F 17/30569
709/246
(Continued)

FOREIGN PATENT DOCUMENTS

EP     1775886     4/2007
EP     1781057     5/2007
(Continued)

OTHER PUBLICATIONS

International Search Report for PCT/EP2013/059309 dated Feb. 18, 2014.
(Continued)

*Primary Examiner* — Meless N Zewdu
(74) *Attorney, Agent, or Firm* — Workman Nydegger

(57) ABSTRACT

A mobile telecommunications network includes a core, a radio access network, and a platform control unit. The platform control unit is capable of identifying a network path of a communication that originated from a mobile terminal. Based on certain characteristics of the communication, the platform control unit will determine whether the communication should be offloaded from its network route. If the communication is to be offloaded, then the platform control unit causes the communication to bypass the network's core.

21 Claims, 12 Drawing Sheets

(51) Int. Cl.
  *H04W 28/02* (2009.01)
  *H04L 12/859* (2013.01)
  *H04W 12/10* (2009.01)
  *H04W 4/50* (2018.01)
  *H04W 76/15* (2018.01)
  *H04W 76/12* (2018.01)
  *H04L 12/14* (2006.01)
  *H04W 8/02* (2009.01)
  *H04L 29/06* (2006.01)
  *H04W 76/11* (2018.01)

(52) U.S. Cl.
  CPC ..... *H04W 28/0215* (2013.01); *H04W 72/048* (2013.01); *H04W 76/12* (2018.02); *H04W 76/15* (2018.02); *H04L 12/1435* (2013.01); *H04L 12/1485* (2013.01); *H04L 63/12* (2013.01); *H04W 8/02* (2013.01); *H04W 76/11* (2018.02)

(58) Field of Classification Search
  CPC ......... H04L 12/10; H04L 12/24; H04L 63/12; H04W 8/02; H04W 76/022; H04W 76/025; H04W 72/048; H04W 76/021; H04W 4/001; H04W 28/0215; H04W 12/10; H04W 4/00; H04W 28/02; H04W 72/04; H04W 12/00; H04W 12/06; H04W 76/16; H04W 88/00; H04W 88/02; H04W 88/08; H04W 80/00; H04W 80/08; H04W 80/10; H04W 80/12; H04W 12/0013; H04W 12/0017; H04W 76/11; H04W 76/02; H04W 76/00; H04W 76/10; H04W 4/50; H04W 76/15; H04W 76/12; H04W 28/00; H04W 28/08; H04W 28/16; H04W 4/02; H04W 12/04; H04W 40/04; H04W 40/00; G06F 11/14
  See application file for complete search history.

(56) References Cited

U.S. PATENT DOCUMENTS

| | | | | |
|---|---|---|---|---|
| 7,787,416 B2* | 8/2010 | Gidwani | ............... | H04W 28/18 370/329 |
| 8,001,615 B2 | 8/2011 | Ksontini et al. | | |
| 8,432,871 B1* | 4/2013 | Sarnaik | ............... | H04W 76/022 370/331 |
| 9,032,387 B1* | 5/2015 | Hill | ............ | G06F 8/61 717/173 |
| 2003/0028649 A1 | 2/2003 | Uhlik et al. | | |
| 2005/0066060 A1* | 3/2005 | Pinkerton | ........... | H04L 12/4641 709/249 |
| 2006/0104232 A1* | 5/2006 | Gidwani | ............... | H04W 28/18 370/328 |
| 2006/0104308 A1* | 5/2006 | Pinkerton | ........... | H04L 63/0485 370/469 |
| 2006/0179079 A1* | 8/2006 | Kolehmainen | ........ | G06F 9/4862 |
| 2006/0293061 A1* | 12/2006 | Kobayashi | ............... | H04L 45/02 455/455 |
| 2008/0201493 A1* | 8/2008 | Richardson | ...................... | 710/15 |
| 2009/0028169 A1* | 1/2009 | Bear | ....................... | H04L 45/00 370/406 |
| 2010/0005291 A1 | 1/2010 | Hulten et al. | | |
| 2011/0070906 A1* | 3/2011 | Chami | ................... | H04L 45/22 455/507 |
| 2011/0179468 A1 | 7/2011 | Adams et al. | | |
| 2011/0307619 A1* | 12/2011 | Ogura | ..................... | H04L 51/14 709/228 |
| 2012/0021755 A1 | 1/2012 | Chin et al. | | |
| 2013/0078949 A1* | 3/2013 | Pecen | .................. | H04L 63/101 455/411 |

FOREIGN PATENT DOCUMENTS

| | | |
|---|---|---|
| EP | 2403186 | 1/2012 |
| GB | 2481659 A | 1/2012 |
| GB | 2481719 | 1/2012 |
| WO | WO2002/097620 | 12/2002 |
| WO | WO2004/032557 | 4/2004 |
| WO | WO2006/116026 | 11/2006 |
| WO | WO2006/126085 | 11/2006 |
| WO | WO2009/020347 | 2/2009 |
| WO | WO2011/109518 | 9/2011 |

OTHER PUBLICATIONS

IPO Search-Report for GB1308163-3 dated Feb. 18, 2014.
IPO Search-Report for GB1308163-3 dated Nov. 7, 2013.
European Exam Report issued in Application No. 13722724.5 dated Mar. 27, 2019.

* cited by examiner

TELECOMMUNICATION NETWORK CONFIGURED TO CONTROL NETWORK COMMUNICATION ROUTES

CROSS REFERENCE TO RELATED APPLICATIONS

This application is a U.S. Nationalization of PCT Application Number PCT/EP2013/059309, filed on May 3, 2013, which claims priority to United Kingdom Patent Application No. 1207816.8, filed on May 4, 2012, the entireties of which are incorporated herein by reference.

FIELD OF THE INVENTION

The present invention relates to a control means for a mobile telecommunications network including a core and a radio access network having radio means for wireless communication with mobile terminals registered with the network, and to a method of operating such a control means for a mobile telecommunications network.

BACKGROUND

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. In fact it has been reported that mobile data growth grew 30 percent over the course of the second quarter of 2009. The most popular use for mobile data was HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operators viewpoint, as the mobile broadband traffic volume carried over 2G, 3G and HSPA (High Speed Packet Access) networks continues to grow, the cost of supporting this data volume is becoming more and more expensive based on the current network architecture and deployments. In fact, access and data volumes are likely to rise faster than the revenue used to build and maintain the networks. This cost differential is exacerbated by one of the current business models being utilised, whereby operators charge a flat rate for unlimited amounts of data.

The increased usage is also unfortunately likely to result in an increase of data traffic jams, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems will only get worse with moves to position mobile data as a replacement for fixed DSL (Digital Subscriber Line) access and with the advent of higher radio access speeds with the proposed 4G LTE/SAE (Long Term Evolution/System Architecture Evolution) network. A large percentage of this traffic will consist of data which is destined for the public Internet, a significant proportion of which mobile operators will not be able to add value to, despite carrying the data on their own backhaul transport, core transport or cellular core infrastructure.

In addition to the problems discussed above, conventional mobile telephone communications networks have architectures that are hierarchical and expensive to scale. Many of the network elements, such as the BTS, routers, BSC/RNC etc are proprietary: devices of one manufacturer often do not interface with devices from another manufacturer. This makes it difficult to introduce new capabilities into the network as a different interface will be required for devices from each manufacturer. Further, conventional base stations are not capable of intelligent local routing or processing. Furthermore, the capacity of existing networks is not always used effectively. For example, many cell sites are under used, whilst others are heavily used.

The current network architecture has the following disadvantages:—
  Hierarchical and expensive to scale
  Backhaul is a major problem
  Proprietary platforms: BTS, BSC/RNC, SGSN etc
  Closed nodes and interfaces
  Very limited application or customer awareness (except for QoS priority)
  No intelligent local routing or processing
  Inefficient use of installed capacity There is therefore a need to overcome or ameliorate at least one of the problems of the prior art. In particular there is a need to address the needs of both the network operators and the users in improving the provision of mobile broadband data services.

SUMMARY OF THE INVENTION

In a general aspect the present invention provides a mobile telecommunications network including a core and a radio access network having radio means for wireless communication with mobile terminals (e.g. UEs) registered with the network, wherein the radio access network includes control means operable to control the use of network resources by said mobile terminals.

The control means may include an application programming interface, API. The API may provide a consistent interface to a multiplicity of applications hosted on the control mean.

The control means may be provided at an access node site or a gateway site.

The control means may be operable to intelligently select functions to provide to the mobile terminals.

The control means may be operable to select intelligently the site at which functions are performed.

The control means may be operable to control the reception and transmission of the content at each of said sites.

The control means may be operable to further control the caching of the content.

The network may further include the features of any one of or any combination of sections 1.1 to 7 below, or subsections thereof.

The control means may include a trusted environment were sensitive data can be stored and where sensitive operations can be performed.

In one embodiment the present invention provides control means for use with a mobile telecommunications network including a core and a radio access network having radio means for wireless communication with mobile terminals registered with the network, wherein the radio access network includes the control means, the control means being operable to control the use of network resources by said mobile terminals; and wherein the control means is operable to host at least one application and includes verifying means for verifying the application before allowing installation of the application.

The verifying means may be operable to verify a signature of the application. The control means may include a trusted area that is configured to store a key used to verify the signature of the application and/or that is useable by the verifying means to verify the application.

The application may be a third party application—e.g. one not created and/or administered by the control means and/or the mobile telecommunications network.

In a second embodiment the present invention provides control means for use with a mobile telecommunications network including a core and a radio access network having radio means for wireless communication with mobile terminals registered with the network, wherein the radio access network includes radio access elements and the control means, the control means being operable to control the use of network resources by said mobile terminals; wherein the radio access network elements use a plurality of identifiers to refer to a one of the mobile terminals; and wherein the control means is operable to maintain a record of the plurality of identifiers for the one of the mobile terminals.

The identifiers may be network IDs used by the radio access elements to reference a specific mobile terminal, e.g. IMSI, IMEI, GUTI, P-TMSI.

The record may be referenced by an ID that is known to the radio access network elements and to the control means.

Each mobile terminal may be referenced by a Binding ID which is known by the radio access elements and the control means. This Binding ID may be maintained for the duration a mobile terminal context (e.g. a 3GPP UE Context). This Binding ID may be known by the radio access network elements. The context may be the logical store of all information relating to the mobile terminal, the mobile terminal capability and any established bearers within the radio access network elements.

In a third embodiment the present invention provides control means for use with a mobile telecommunications network including a core and a radio access network having radio means for wireless communication with mobile terminals registered with the network, wherein the radio access network includes radio access elements and the control means, the control means being operable to control the use of network resources by said mobile terminals; wherein the control means is operable to receive information relating to the mobile terminal from the radio access elements when the mobile terminal becomes active.

The control means may include means operable to receive from the radio access elements identity data for the mobile terminal.

The radio access elements may provide the a Network Information Services function on the control means with the mobile terminal context information, including any or all of: mobile terminal Binding ID; P-TMSI/GUTI/etc.; S-RNTI, D-RNTI; IMEI (TAC, SNR & SVN); 3GPP UE Radio Access Capability; RRC State Indication; and 3GPP UE Context Information. This information may be provided within 20 ms of the mobile terminal context being established and within 20 ms of any changes to the mobile terminal context occurring (e.g. TMSI).

In a further embodiment of the present invention the radio access elements may provide a Network Information Services function of the control means with a set of performance measurements including any or all of:

LTE Cell Performance Measurements—Resource Block Utilisation (UL & DL); No. of RRC Connected Users for each Customer Class; Average Scheduled UEs for each Customer Class (UL & DL); Average TX Power (DL); Average Cell Throughput (UL & DL) per defined Traffic Flow (i.e. QCI); Average Scheduled UEs (UL & DL) per defined Traffic Flow (i.e. QCI); Average Packet delay in Buffer per defined Traffic Flow (i.e. QCI);

3G Cell Performance Measurements—Average HS Code Utilisation (DL); No. of RRC Connected Users per Customer Class; Average Scheduled UEs (UL & DL) per SPI; Average TX Power (DL); Average HS Throughput per SPI (UL & DL); Average Total Received Wideband Power (UL);

LTE UE Performance Measurements—Average Bearer Throughput per 001 (UL & DL); Serving Cell RSRP (DL); Serving Cell RSRQ (DL); Neighbour Cell RSRP (DL); Neighbour Cell RSRQ (DL); Average CQI (UL & DL); TX Power (UL);

3G UE Performance Measurements—Average HS Bearer Throughput per SPI (UL & DL); Serving Cell RSCP (DL); Serving Cell Ec/No (DL); Neighbour Cell RSCP (DL); Neighbour Cell Ec/No (DL); Average CQI (UL & DL); TX Power (UL); and Transmission Performance Measurements—Average BS Transmission Utilisation (UL & DL).

The control means mal provide a facility allowing the mobile telecommunications network operator to define and derive additional parameters based on the basic measurements specified above or in Appendix A which can be exposed to applications on or off the control means platform.

The control means platform may be capable of exposing local Network Information Service information to external Applications or Services outside the control means platform using External Communications Services.

In a further embodiment of the present invention the Network Traffic Services function of the control means may be capable of controlling the routing function in the radio access elements such that User Traffic of only certain UEs is passed to the Network Traffic Service. UE parameters used to control this routing per UE may be, e.g., UE IP address.

In a fourth embodiment the present invention provides control means for use with a mobile telecommunications network including a core and a radio access network having radio means for wireless communication with mobile terminals registered with the network, wherein the radio access network includes the control means, the control means being operable to control the use of network resources by said mobile terminals; and wherein the control means is operable to control the routing of the mobile terminal traffic in dependence upon the type of traffic.

In a further embodiment the present invention the Network Traffic Services function of the control means may be capable of supporting plain end-to-end IP communications from the radio access elements to one or more Applications running on control means platform, and traffic from Applications back to radio access elements. The Network Traffic Services function of the control means may be capable of supporting GTP-U encapsulated (in accordance with, e.g., 3GPP TS 29.281—which is fully incorporated herein by reference) communications from the radio access elements to one or more Applications running on control means platform, and traffic from Applications back to radio access elements.

In a fifth embodiment the present invention provides control means for use with a mobile telecommunications network including a core and a radio access network having radio means for wireless communication with mobile terminals registered with the network, wherein the radio access network includes the control means, the control means being operable to control the use of network resources by said mobile terminals; and wherein the control means is operable to host at least one application and includes means operable to support simultaneous communication of the mobile terminal with the application and with another destination.

The control means platform may be capable of supporting simultaneous communication of a UE to services provided by Applications in the control means platform as well as communication to other services in the Internet or in other IP networks that are connected, e.g., to GPRS or EPS.

In a sixth embodiment the present invention provides control means for use with a mobile telecommunications network including a core and a radio access network having radio means for wireless communication with mobile terminals registered with the network, wherein the radio access network includes the control means, the control means being operable to control the use of network resources by said mobile terminals; and wherein the control means is operable to host at least one application and includes data transfer means operable to pass data from a source to the application for processing; and wherein, if the application generates response data, the transfer means is operable to send the response data to the source.

Network Traffic Services in the control means may be provided to Applications in two ways:
1) Pass-through Mode where data is passed to the Application, modified in some way and re-inserted back into a network service bearer, or
2) End-point Mode where data is passed to the Application and terminated by that Application.

In a seventh embodiment the present invention provides control means for use with a mobile telecommunications network including a core and a radio access network having radio means for wireless communication with mobile terminals registered with the network, wherein the radio access network includes the control means, the control means being operable to control the use of network resources by said mobile terminals; and wherein the control means is operable to host at least one application and includes means operable to identify individual radio access bearers, or portions thereof, relating to the application. The Network Traffic Services routing function of the control means may identify and route individual radio access bearers (RABs) and Traffic/Service Flows to Applications on the control means Platform (using parameters such as UE ID, Protocol type, Application type etc.).

The means operable to identify individual radio access bearers, or portions thereof, relating to the application may be further operable to route the radio access bearers, or portions thereof, to the application. The Network Traffic Services function of the control means may be able to route individual established Radio Access Bearers and the Traffic/Service Flows within these bearers to Applications on the control means platform.

In an eighth embodiment the present invention provides control means for use with a mobile telecommunications network including a core and a radio access network having radio means for wireless communication with mobile terminals registered with the network, wherein the radio access network includes the control means, the control means being operable to control the use of network resources by said mobile terminals; and wherein the control means is operable to host at least one application and includes means for making data packets relating to particular ones of the applications distinguishable from data packets relating to other ones of the applications. The Network Traffic Services function of the control means may provide a network operator-configurable packet marking capability enabling the prioritisation of information from particular Applications within a Network Element's (e.g. radio access network element) Scheduling or Queuing functionality.

The control means may include means operable to prioritise the distinguishable data packets. The Network Element (e.g. radio access network element) may provide the functionality to interpret the packet marking from the Network Traffic Services function of the control means and prioritise packets on the Radio and Transport from Applications accordingly.

In a ninth embodiment the present invention provides control means for use with a mobile telecommunications network including a core and a radio access network having radio means for wireless communication with mobile terminals registered with the network, wherein the radio access network includes radio access elements and the control means, the control means being operable to control the use of network resources by said mobile terminals; and wherein the control means includes an operations and maintenance (O&M) function. An O&M system for the control means Platform may be provided allowing at least Performance Management, Configuration Management & Fault Management for the control means platform.

The operations and maintenance function may related to an operations and maintenance function of at least one of the radio access elements to which the control means is connected. The O&M system for the control means platform may be an extension of the O&M system for the Network Node (e.g. radio access element) to which the control means platform is connected.

BRIEF DESCRIPTION OF THE DRAWINGS

An embodiment of the present invention will now be described in more detail with reference to the accompanying Figures in which.

DETAILED DESCRIPTION

Key elements of a 3G mobile telecommunications network, and its operation, will now briefly be described with reference to FIG. 1.

Each base station (e.g. Node B 1 and Femto 2) corresponds to a respective cell of the cellular or mobile telecommunications network and receives calls from and transmits calls to a mobile terminal (not shown) in that cell by wireless radio communication in one or both of the circuit switched or packet switched domains. The mobile terminal may be any portable telecommunications device, including a handheld mobile telephone, a personal digital assistant (PDA) or a laptop computer equipped with a network access datacard.

The nodeB 1 or Femto 2 can be considered to comprise two main parts: a radio frequency part (radio unit) and a baseband part. The radio frequency part handles the transmission of radio frequency signals between the antenna of the nodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a CDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) 5 in the Packet Switched Core Network. In FIG. 1, Node B 1 is controlled by RNC 3 across the Iub interface. An RNC may control more than one node B.

Figure 1:
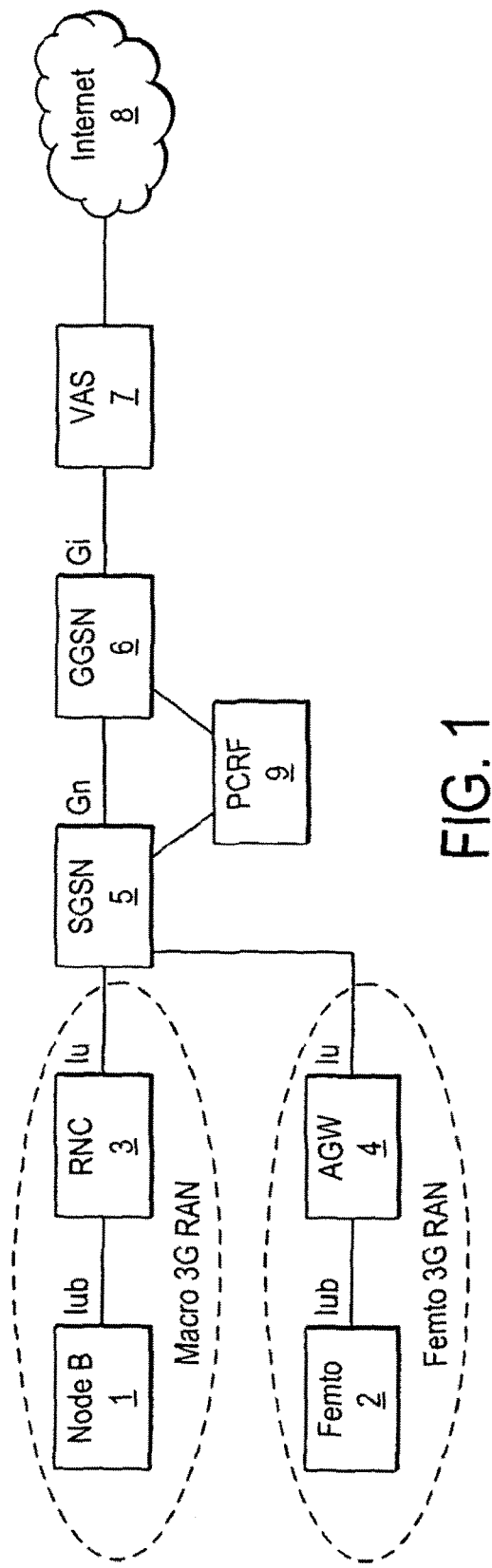
FIG. 1 illustrates a high level packet data network architecture, useful for explaining the prior art and embodiments of the present invention.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 would typically be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the IP interface. The RNC 3 typically has a dedicated (not shared) connection to its SGSN 5, such as a cable connection.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted there-between by IP transport/DSL transport. The Femto or AGW converts the cellular telecommunications transport protocols used between the mobile terminal and the Femto 2 to the appropriate IP based signalling.

The Femto 2 may be connected to the AGW by means other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register. The GGSN is responsible for IP address assignment and is the default router for the connected mobile terminal. The GGSN also performs authentication and charging functions.

Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes in particular, a PCRF (Policy and Charging Rules Function) apparatus 9 is also provided, in communication with both the SGSN 5 and the GGSN 6.

The SGSN 5, GGSN 6, VAS 7 and PCRF apparatus 9 comprise the core network of the mobile telecommunications network.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Data in a mobile telecommunications network can be considered to be separated into "control plane" and "user plane". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the internet. That is, all data is directed from the applicable RAN through the core network components SGSN, GGSN and VAS before reaching the internet. All PS traffic accordingly follows the same path and therefore has the same network costs. All applications are processed on the client (on the mobile device) or on the server (which is connected to the internet), and the network core therefore acts like a bit-pipe in the current architecture. For data, where the mobile network operator cannot add any value by carrying it on its own backhaul transport, core transport or cellular core infrastructure (the core network), such as data destined for the public internet without required intervention from the core network, there is no benefit to routing this data via the core network.

However, a large percentage of this traffic can be handled in a more intelligent manner for example through content optimisation (Video & Web), content caching, or locally routed or directly routing content to the public Internet. All these techniques reduce the investment required by a mobile operator to carry the data on its own backhaul and core transport or cellular core infrastructure.

In order to offer low cost packet data, to support new services and to manage customer expectation, a step-change reduction in the end-to-end cost per bit is required.

Mobile operators want to reduce their packet data handling costs through alternate network architectures based on commoditised IT platforms, breaking away from the traditional architecture based on their voice legacy. These new network architectures overcome the Access architecture issues of today In order to successfully offer cheap packet data and be able to compete with the fixed broadband offers (flat fee) a solution is proposed which focuses on the reduction of the end-to-end cost per bit, especially for Internet access service.

This enables mobile operators to reduce packet data handling costs by means of an alternative network cost model architecture, which breaks out of the traditional network architecture and nodes and utilises lower cost transport networks to optimise the data flow.

Figure 2:
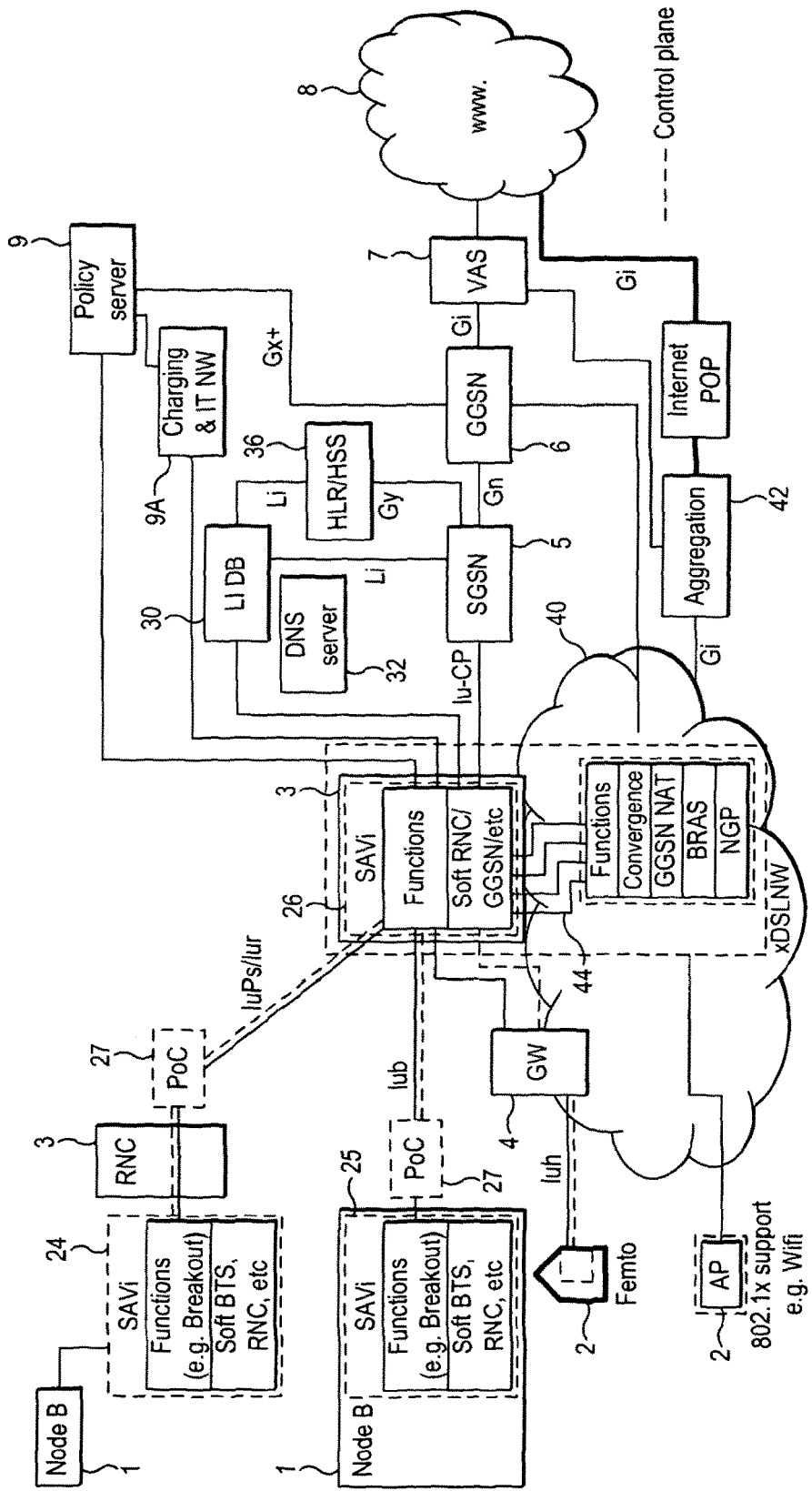
FIG. 2 illustrates the introduction of a new functional "platform" in a 3G network.

In this regard, FIG. 2 shows a high level description of the architecture that may be adopted to deploy this on a 3G network.

According to this arrangement, novel "platforms" (control units) 24, 25, 26 for performing functions such as caching, routing, optimisation and offload/return decision functionality are integrated into the network. This decision functionality may be incorporated in the radio architecture. In this regard, the platforms 24, 25, 26 may be incorporated into the NodeBs 1 (25), RNCs 3 (26) or exist as separate physical entities (24). It is these platforms 24, 25, 26 that, for example, determine the path of communications originating from the mobile terminals.

The exact placement of the platform 24, 25, 26 is not essential, and, for a macro 3G network, it can be placed at or between the Node Bs and the RNCs, and also between the RNCs and the SGSNs (or any combination thereof). It would also be possible to place the platform 24, 25, 26 at the GGSN (although not the SGSN as this does not control user data, only control data).

In the 3G Macro network, the aim is to offload a high percentage of the macro network traffic from the core and transport (IuPS, Gn, etc) by diverting specific traffic type for certain user(s) class directly to the Internet.

Where the platform 24, 25 is located in the Node Bs (or on the Iub interface), it may be possible to redirect the data from all the remaining mobile network elements (e.g. the RNC, SGSN, GGSN and VAS for macro 3G), and sending the data directly to the Internet 8. In a similar manner, where the platform 26 is located at the RNC (or on the Iu interface), it becomes possible to redirect the data from the SGSN 5, GGSN 6 and the VAS 7. The alternative data route is preferably a DSL using ADSL.

It is also preferable to aggregate the alternative data routes for each cell, where applicable. In this regard, each cell will have at least one RNC 3 and a plurality of Node Bs, so where the decision blocks are situated at or in the vicinity of the Node Bs, for instance, there will be a plurality of links which should ideally be aggregated before being passed to the Internet 8. At the point of this aggregation 42, there is preferably a further decision block which enables data to be returned to the legacy route. For instance, a new policy rule may have been implemented, which requires or enables previously offloaded data to be returned to the core network route. This new policy rule may be communicated to the return decision module by the core network policy module. In FIG. 2, this returning of data is only shown to the VAS 7, but the data may be returned to one or more of the other core network elements.

Each of the NodeBs 1 is connected to the mobile network core through a Point of Concentration (PoC) 27. All traffic from the NodeBs 1 which is to be routed through the core mobile network is routed to the PoC 27. This includes both user plane and control plane data. On the control plane level, the PoC 27 routes data to and from the SGSN 5 and the GGSN 6. Control data is also sent to and from other core network components, including the Lawful Interception Database (LI DB) 30, DNS Server 32, Policy Server 9 (including Charging rules and IT Network 9A) and Home Location Register/Home Subscriber Server (HLR/HSS) 36 (which contains subscriber and device profile and state information).

User plane data is transmitted by the PoC 27 to the SGSN 5 and the GGSN 6. From the GGSN 6, data is routed across a VAS 7 node to the Internet 8. In 3G this is the standard data path from the mobile terminals to the Internet.

To implement an advantageous feature, an alternative path on which to re-route certain data to the Internet 8 is provided, whereby, each NodeB 1 and Femto 2 may be connected to a fixed line connection 40 (e.g xDSL) which is directly connected to the internet 8. These xDSL connections may be made directly to the NodeB and/or Femto or made to the NodeB/Femto via other components, such as the PoC 27. In FIG. 2, the xDSL Network 40 may be a third party network or may be a network owned or controlled by the owner of the mobile telecommunications network. By using such an alternative path, radio capacity, backhaul transport resource, core transport resource, cellular core network resources can be saved as well as improving performance and enhancing revenue for the mobile network operator.

As each Node B 1 and/or PoC 27 is associated with a platform 24, 25, 26, for each data packet request originating from a mobile terminal, a decision at the platform 24, 25, 26 is made as to whether the traffic may bypass the core mobile network entirely or may be passed into the core mobile network. The location at which the traffic is routed towards the internet is preferably at the platform 24, 25, 26; however, it may alternatively be routed out from the core network towards the internet at a different component. Traffic offloaded from the macro network is routed by the platform 26 to the xDSL network 40 by link 44 (the decision to offload this traffic may have been made at platform 24, 25 or 26—although the decision is implemented at platform 26)

Figure 3:
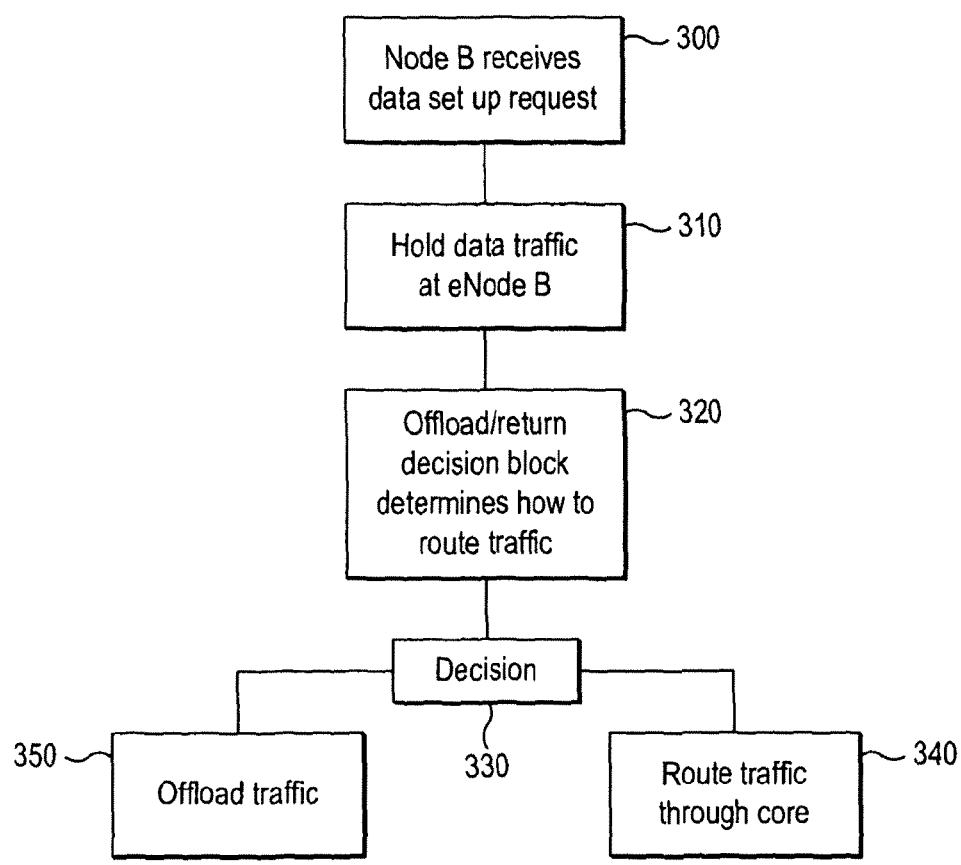
FIG. 3 illustrates a flow chart of an example offload decision process as implemented in the 3G network of FIG. 2

Preferably the Offload/Return decision is dependent upon the type of data or user. To exemplify this feature of the embodiment, FIG. 3 is a flow diagram showing the steps taken when deciding how to route the traffic in the architecture of FIG. 2. For instance, consider an NodeB receives a request to set up a data call from a user device which is camped on the NodeB at 300. Once the NodeB has identified the request as a data call and the type of traffic/user, rather than automatically routing the data traffic to the core network, the data request is held at the NodeB at 310 until a decision has been made as to how to route the data, in particular whether to offload the traffic directly to the internet or whether to return the data through the core mobile network. Typically, the signalling (control plane) for the connection will continue through the normal route but the user data traffic will be held at the NodeB, this is possible by virtue of the separate user and control planes, as shown in FIG. 2.

The decision as to whether or not to use the Core mobile Network to route the data traffic can be based on various aspects, particularly relating to the properties of the data being routed and/or status of the user routing the data.

The Mobile Network may add value to traffic by providing a number of services, such as compressing the user data to speed-up the data transfer while downloading (if this functionality is not already supported by the platforms 24, 25, 26). These different services can be broken up into groups and provided by different entities (e.g. this enables greater flexibility in the provision of the services, such as the mandated Internet Watch Foundation—IWF—requirement, which can only be supported by the mobile operator). The platforms 24, 25, 26 therefore make a decision on whether to service the data locally through caching, fetch the data from other node or from the internet via offload functionally or whether to route the traffic through the core network, based on the applicability of one or more of the services to the traffic. That is, platform 24, 25, 26 decides when data traffic requires one or more of the services and when it can do without them.

It should also be noted that these services are ones that could be provided without using the core network. These are services that add value to the customer, and which subscribers will pay for (explicitly or implicitly).

Referring again to FIG. 3, the platform 24, 25, 26 decides at 320 what to do with the traffic (from coming for the network/internet or orientated by the device). This decision may be made by interrogating certain servers or databases stored centrally within the core network which can compare the type of service, type of user etc with criteria which identifies the type of action shall be considered, e.g whether the traffic is suitable for offloading directly to the internet (at 330) from the NodeB or whether the traffic should be routed through the core (at 340). Examples of some of the considerations used in influencing the decision of whether to offload the traffic are discussed below in more detail. The implementation of this data offload technique needs to be carefully considered, as it places additional constraints on the network design.

The following is a non-exhaustive list of examples of challenges that have to be considered when implementing the data offload technique:

a) maintaining Customer Services provided by the core
      network or otherwise;

b) maintaining Network Services (e.g. Charging Rate Limiting/application control); and
c) maintaining Regulatory Services (e.g. to enable Lawful Interception and Regulatory Content Filtering).

Some specific examples of Customer Services that can be taken into account by the offload decision module include:
  i) Parental Control: A service which customers subscribe to that filters content in order to shield children from unwanted websites and programs. Whether traffic from a given user needs to be filtered can be determined by a Common User Repository (CUR) lookup, where the CUR stores user profile information, such as whether the user is an adult or a child etc. If traffic needs to be filtered, then either the traffic cannot be offloaded or it needs to be filtered somewhere other than the core network.
  ii) Traffic Optimisation: Optimisation is only required for low bandwidth connections (2G). By looking at the Radio Access Type (RAT) and the International Mobile Equipment Identity (IMEI) it can be determined whether or not a subscriber needs these services. Where traffic optimisation is not required, the traffic can be offloaded
  iii) Marketing Proposition: The mobile network is typically setup to provide full mobility with acceptable Quality of Service (QoS). A further option could be to offer best effort QoS without guaranteed full mobility. As an example, for when a heavy user has exceeded their fair usage limit, their traffic could be designated as low priority traffic and offloaded.

The Network Services that can be taken into account by the offload decision module are typically those that the network operator needs to manage its network. Some examples include:
  i) Charging: The charging plan that a user subscribes to can be used to determine whether or not to offload that user's data. For instance, it is most easily avoided when the customer has a flat rate plan. That is, users on flat rate plans do not need their usage tracked for charging purposes in real time and so can be offloaded onto the alternative route. For users who are roaming or whose charging plan depends upon usage, then, the operator/supplier needs to track their total usage in real-time, and so their data needs to be maintained on the core network route so that rate-limits and data usage can be accurately tracked and alarms/alerts activated when usage exceeds allowances. This is because, if this is not avoidable then Call Data Records (CDRs) need to be generated by the module for the real time charging.
  ii) Rate-limiting/application control: This is currently used to manage the traffic flow according to a certain usage policy. Excessive bandwidth usage or controlling P2P applications are common reasons to rate limit users. Therefore, where a user transmitting data is determined to be under a rate restriction (i.e. throttling) or the data they are transmitting has an application restriction (i.e. the application is blocked), then that data can be offloaded. This exceeded allowance information would typically be communicated to the decision module (24, 25, 26) by the HLR/HSS. This traffic management enables the total traffic volume to be reduced and is typically fully managed by the network operator.
  iii) QoS: The network uses QoS to manage traffic during high load situations and to support marketing propositions. To enable QoS considerations to be enforced by the offload decision module, a connection is established between the offload module and the Policy and Charging Rules Function (PCRF) entity. This enables decision criteria to be dynamically fed to the offload module, for instance to maintain high priority users on the core network path and/or high priority application types, such as VoIP. It is to be appreciated that the connection to the PCRF is not essential, and alternatively, static or semi-static rules, pre-stored with the offload module, can be considered.
  iv) Mobility: Mobility, such as cell handover, is an issue that needs to be managed by the core network. Therefore, terminals that are in motion should not be offloaded. The mobility of a mobile terminal could be determined by querying the Node B. Some users could be provided with a contract that allows only fixed or limited mobility use, so that the service provided was equivalent to a fixed broadband package. Different charging tariffs could be applied depending on whether a user was at a fixed location or mobile. Two ways the offload decision module can handle a mobile terminal's mobility are as follows:
    1. The offload decision module can have the capability to characterise the radio link between the device and the network by monitoring the number of handovers implemented for the mobile terminal. If a certain number of handovers occur over a fixed duration, the mobile terminal can be classified as in motion, and any data from the mobile terminal can thereafter be routed back into the core network to avoid any further packet data delay. This of course assumes that the mobile terminal had been designated for data offload on the bypass link.
    2. The offload decision module is situated on the IuPS for the 3G network (i.e. between the RNC and the SGSN) or Si for the LTE (i.e. between the eNode B and the PoC), and checks the Iur or X2 signalling information (i.e. between a set of RNCs controlled by a given 3G SGSN and between a corresponding set of eNode Bs for LTE). If this monitoring shows that a mobile terminal is hopping between cells one of which is not connected to (and therefore managed by) the offload decision module, any data from the mobile terminal can thereafter be routed back to the legacy path through the core network.

Regulatory Services are services that are mandated by legislation, and are typically provided to all traffic. Some specific examples of Regulatory Services that can be taken into consideration by the offload decision module include:
  i) Lawful Interception (LI): The ability to provide Lawful interception will be maintained in any offload or local breakout plans. The options for offload are:
    Maintain the evaluation of LI in the core network, and not offload users whose traffic needs to be intercepted (e.g. where the user has been tagged by the police for communication interception). Since the LI functionality is handled by the core network, the core network accordingly cannot be bypassed;
    Add LI capability to the offload decision module, which will require a local LI interface with a dedicated database identifying the users to be intercepted. With this option, upon identifying traffic from a user on the list, a copy of the data can be made at the local LI interface and the traffic offloaded. The copied data can then be reported to the appropriate authorities; or
    Alternatively, LI may be performed at the Internet Service Provider (ISP). With this option, since LI is considered at the ISP it is not a consideration at the offload decision engine, and so the data may be offloaded, where possible. However, to effect this option, a Service Level Agreement (SLA) with relevant ISP providers may need to be amended in order to include the support of LI in the ISP network rather than in the mobile network infrastructure.

ii) Regulatory Content Filtering (e.g. for Internet Watch Foundation (IWF)): This required functionality blocks illegal websites. This functionality could easily be added to the offload decision module as it is not processor intensive. An http proxy server, for instance, could be used to support this functionality. Otherwise, the traffic will be returned back to a dedicated core node(s).

A further criterion that the platform (24, 25, 26) module may consider is the priority of the customer. In this regard, a network operator may wish to prioritise traffic across its network based on the priority level of the customer. For example, a high value customer (e.g. a corporate customer or a subscriber with on a high tariff contract) may be given priority over a low value customer. In this situation, a network may decide to offload lower value customers directly to the internet. This is related to the QoS criterion mentioned above, although the QoS criterion is generally linked to traffic management to maintain a balanced network, whereas the priority referred to can be used to ensure subscribers get a level of service commensurate with their service agreement.

The embodiment of FIG. 2 is in relation to a 3G network. Embodiments of the invention are equally applicable to 4G (LTE/SAE) networks.

The LTE/SAE macro network includes eNode Bs which make up the RAN. The eNode Bs effectively combine the functionality of the node B and the RNC of the 3G network. These eNodeBs are the network components which communicate with the mobile communication devices. It is envisaged that the eNodeBs will be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

The platforms would operate in the same manner as described in relation to the 3G network. The platforms may be located at many different locations in the 4G network.

Figure 4:
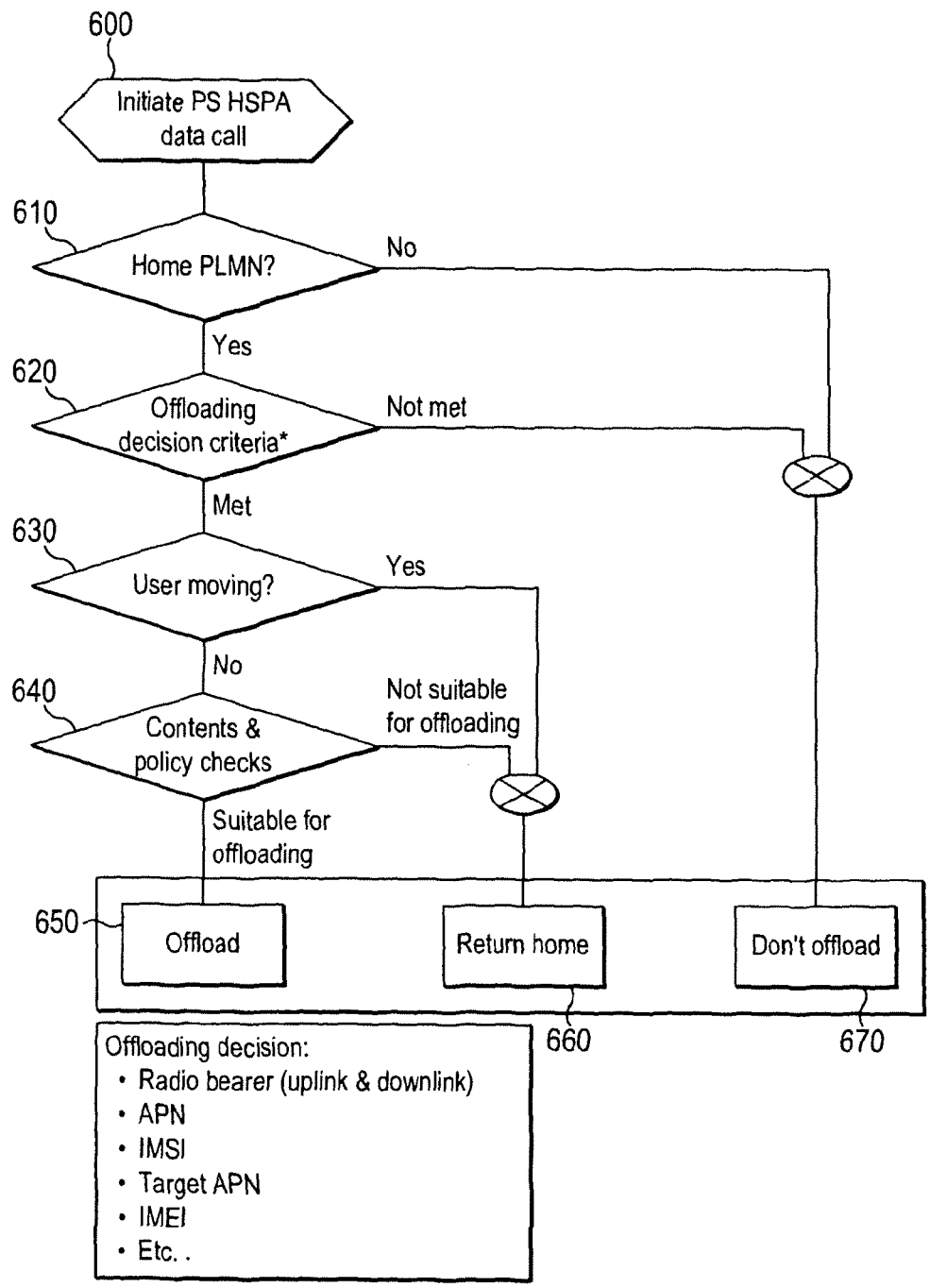
FIG. 4 illustrates a flow chart of an example offload decision making process that may be implemented by a redirection module

A more specific example of how the platform 24, 25, 26 may be implemented is described in relation to FIG. 4. FIG. 4 is a flow diagram illustrating a preferred method for deciding whether to offload data traffic to the internet. The decision structure is composed in a hierarchical form in order that certain types of user or data are always directed through the core network. The example of FIG. 4 is described for a 3G network but it will be clear to those skilled in the art that these decisions could be applied to any type of radio access technology.

Once a PS HSPA data call (or other connection) is made and received at the Node B at 600, a primary consideration by the platform 24, 25, 26 at 610 is whether the device is operating on its home network or whether it is roaming. If the device is roaming then all traffic is automatically routed through the core network. The reason for this is that the home network would want to guarantee the security and accurate billing (due to different charging principle between home and visited operator) of the user's traffic. The platform 24, 25, 26 at 610 will also consider other factors, such as what application types running on the mobile terminal require connections. If the mobile device is operating on its home network at 610, or if the applications do not require a connection to the core network, the platform 24, 25, 26 considers secondary offloading criteria at 620. Examples of secondary criteria may include the functions required by the device, the radio bearer currently used by the device, the APN, or the priority level of the customer identified, for example, through IMSI, IMEI or the target subscriber. If the offloading criteria are met at 620, the decision moves to the tertiary criteria, otherwise, the traffic is not offloaded.

At 630, the system checks the mobility of the user. If the user is moving, he is considered not suitable for offload due to an expected interruption delay of the user data when moving between source and target cell.

Finally, at 640 the system conducts a contents and policy check to confirm whether the user is suitable for offload. If it is determined that the user is suitable for offload to the internet, the eNodeB offloads the traffic to the Internet at 650. If it is determined that the user is not suitable for offloading to the internet at 640 then the procedure returns "home" at 660. A connection is provided by a network core in a conventional way and the tests of the flowchart shown in FIG. 4 are repeated periodically to determine whether offloading directly to the internet becomes possible subsequently.

If the device is determined to be roaming at step 610, then the device is not offloaded directly to the internet, but remains connected via the network core in a conventional way at 670. Similarly, if the offloading criteria are not met at steps 620, the mobile device remains communicating via the network core in the conventional way, again at 670.

The hierarchical decision method is useful because it reduces the number of challenges across the network. It will be evident to those skilled in the art that different hierarchical structures will be appropriate for different networks, different conditions etc and that the example of FIG. 4 is just one way the decision could be made.

For instance, whilst arrangements have chiefly been described in relation to transmitting data traffic from a mobile terminal to a data network, the principles may also be applied to transmissions from a data network towards a mobile terminal.

In the arrangements described above the decision regarding the route is said to be made at call set-up. However, it should be appreciated that a decision to change the routing of data may be made at the beginning of a communication session (for example establishment of a PDP context), or during a communication session. The routing of data may change several times during a single communication session. For example, when a communication session is initiated it may be detected that the user is not moving, in which case a decision will be made to offload the data over the alternative data route. Subsequently it may be detected that the user is moving, and at this point a decision may be made to beginning routing data for the communication session via the mobile network. During the communication session, the mobile terminal may become stationary for a prolonged period of time again, and at this time a further decision may be made to send subsequent data during the communication session via the alternative data route. Subsequently again, the user may then attempt to access age-restricted content, and it will be detected that parental control is required. In response for the requirement for parental control, a decision may be made to redirect subsequent data during the Communication session via the core network so that core network parental controls can be applied.

It is to be appreciated that the present embodiments of the invention are to be distinguished from HSDPA offload, a technique used on the Iub interface between the Node B and the RNC. HSDPA offload which serves to separate data traffic from voice traffic, so that non-real time data traffic is sent down a less expensive backhaul to complement or replace the expensive E1/T1 TDM backhaul link between the two. Once this diverted traffic reaches the RNC, however, it is returned to the cellular and transport core networks and there is no differentiation made based upon data traffic type.

In the arrangement described above the platform 24, 25, 26 primarily handles data offload decisions. As will be described below, the platform can perform may other functions.

Embodiments of the invention in which the Radio Access Network controls the use of resources by mobile terminals will now be described.

Platform Architecture

Figure 5:
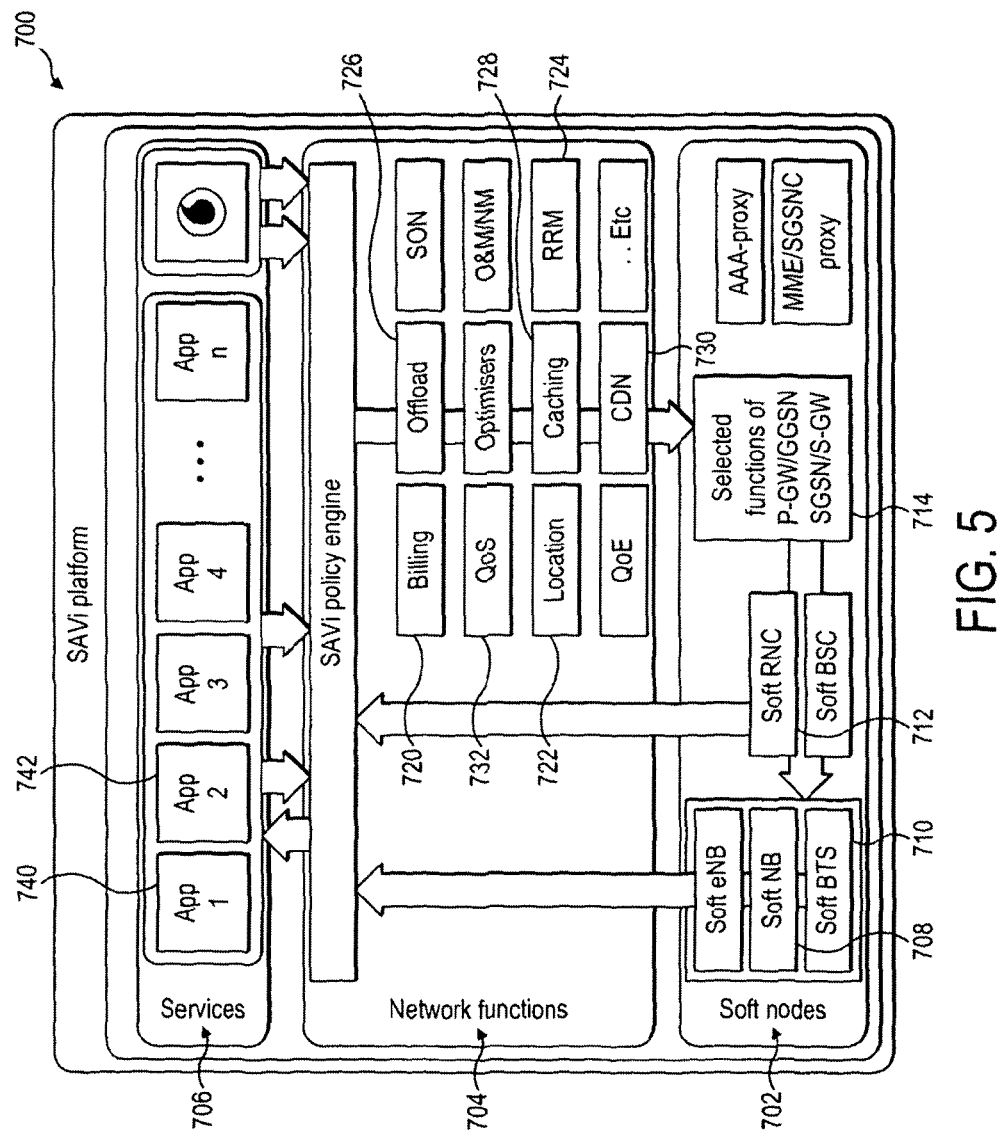
FIG. 5 shows the novel "platform" in more detail provided in the Radio Access Network in accordance with an embodiment of the invention.

As discussed above, a mobile telecommunication network is modified by the introduction of a "platform" 24,25,26. Such a platform (or control unit) is shown in more detail at 700 FIG. 5 and which includes three principal parts: soft nodes 702 (physical/transport layer), network functions 704 and services 706 (application layer).

The platform 700 communicates with the radio frequency/RF part (radio unit) of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

The network functions part 704 of the platform 700 includes modules for performing functions similar to those performed by the core network of a mobile telecommunications network, such as billing 720, location tracking 722 and the radio resource management (RRM) 724. The network functions may further comprise an offload decision module 726 that performs a function similar to the offload decision modules 24, 25 and 26 described above. The network functions part 704 may further comprise a caching function 728 and Content Delivery Network function 730.

The network functions parts 704 of the platform 700 provides an Application Programming Interface (API) framework to the services part 706 of the platform 700. The services part 706 of the platform supports a plurality of applications 740, 742 etc.

The network functions fall into three main categories, those that enable the network operation (e.g. charging, O&M), those that support service operation (e.g. Location) and those that optimise the usage of the network by certain applications and services (e.g. Caching, Video Optimisation).

The applications supported on the Platform 700 are the entities that supply or demand the flow of data on the network, akin to a server on the internet, e.g. gaming server, navigation server.

The API is implemented by a software program running on the network function part 704 which presents a novel standardised interface for the applications 740, 742 etc of the services part 706. The novel standardised API provides a consistent interface, defining communication protocols, ports etc. Full details of the API may be published to allow a multiplicity of applications to be developed for the platform 700 by multiple developers. This should be contrasted with prior art arrangements where each component of a mobile telecommunications network (such as BTS, BSC/RNC, SGSN etc) is proprietary and tends to have a unique interface, meaning that a different application must be written for each node of a conventional network.

The applications 740, 742 etc may provide services to users of the telecommunications network by co-operating with other parts of the platform 700.

The details of the use of each application used by the a user of the mobile telecommunications network is stored in an application context/container. The Application context contains application names, protocol used to carry such application, their characteristics that are measured/reported over period of time and some statistical information about these applications (volume, number of users using these applications, etc.).

Figure 6:
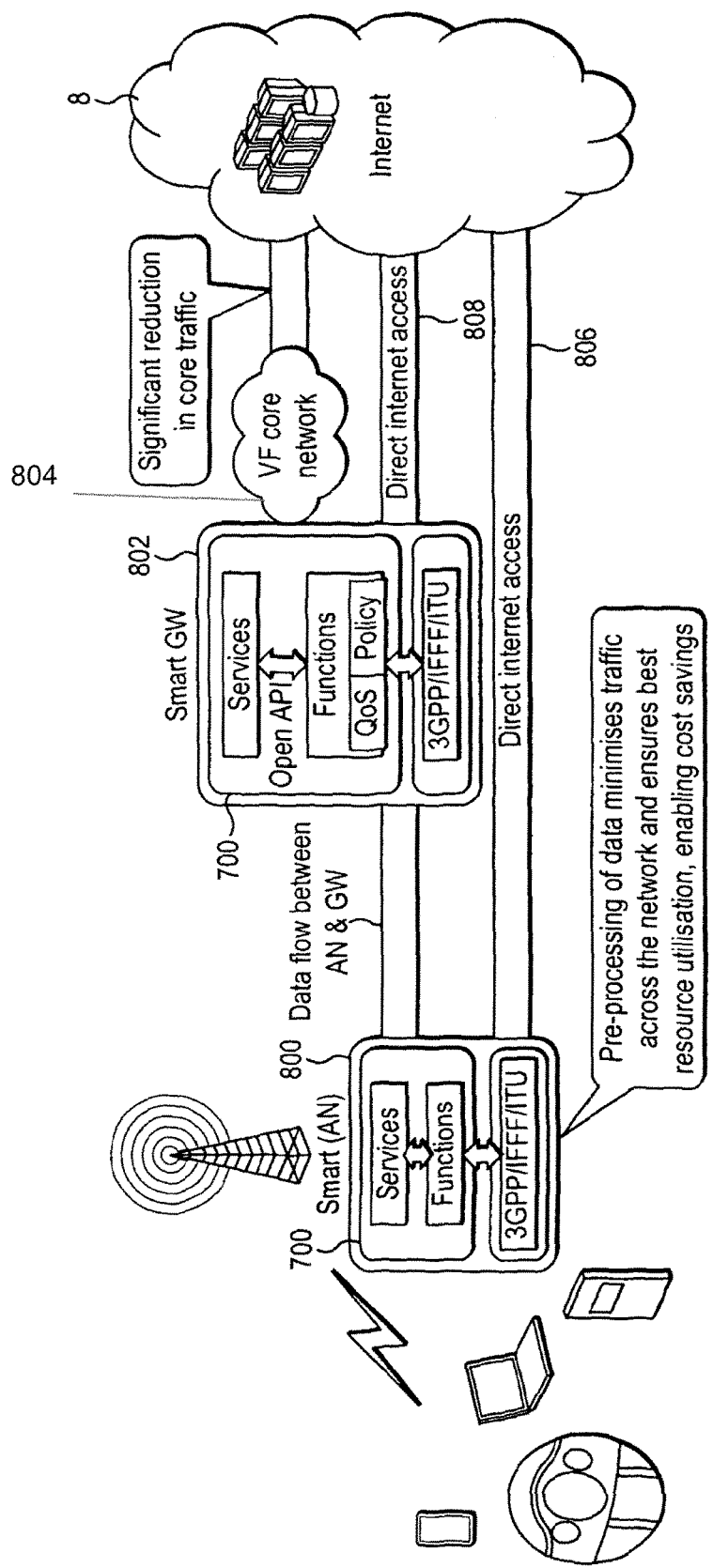
FIG. 6 shows possible locations of the platform within a mobile telecommunications network.

As shown in FIG. 6, a platform 700 may be provided at each base station of the mobile network (where it is connected to the radio frequency part of the base station—NodeB 1 in FIG. 2), forming an access node 800. Platform 700 may also be provided at the RNC (item 3 in FIG. 2) where it forms a gateway 802. The access node 800 and the gateway 802 are both configured to communicate directly with the network core 804 (for example, comprising the SGSN 5, GGSN 6 and VAS 7 (as shown in FIG. 4)).

The access node 800 and gateway 802 may also be connected to the internet 8 for direct Internet access via direct links 806 and 808, respectively, such that at least a portion of the core network 804 is bypassed in the manner described above.

The following are examples of access technologies that can be provided within the access node 700:
3GPP: GSM/GPRS, UMTS/HSPA & LTE
IEEE: 802.11 family & 802.16 family
ITU: DSL, ADSL, VDSL, VDSL2

Allocation of Functions to Platforms

Figure 7:
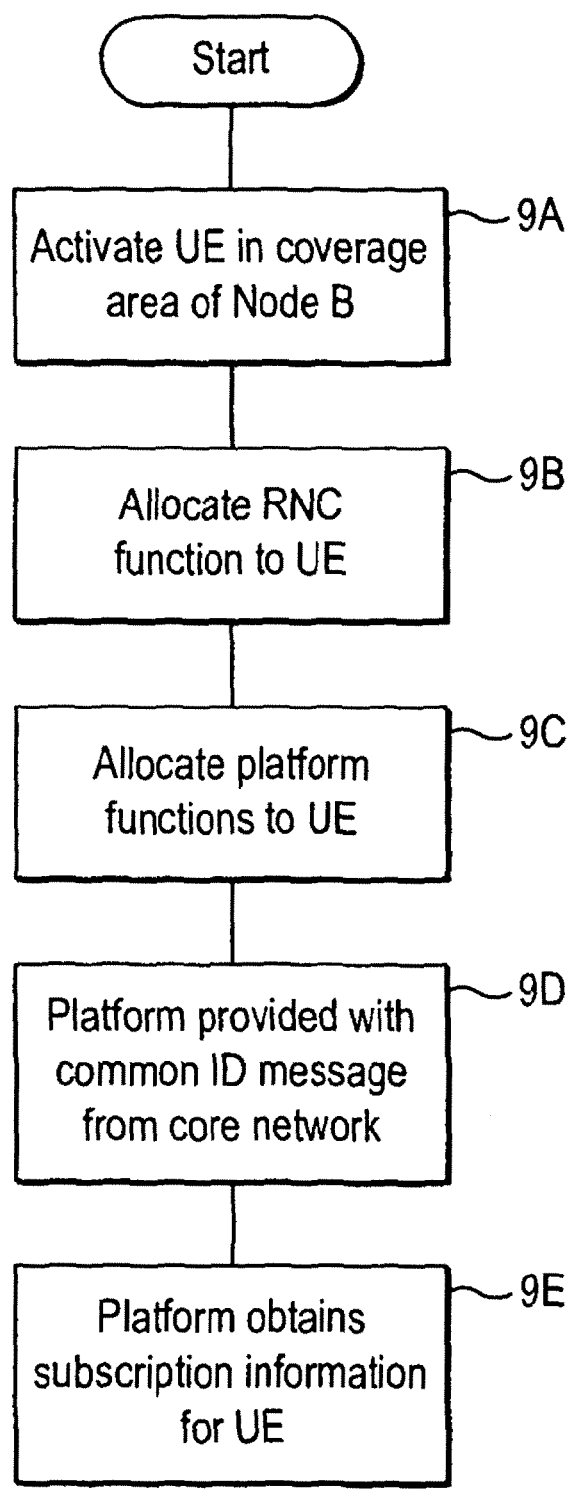
FIG. 7 is a flow chart showing the steps performed when a mobile terminal is activated.

The steps performed when a mobile terminal is activated at a NodeB, at the Femto or at the Access Point (AP) of the network which includes the novel platform 700 will now be described with reference to FIG. 7. At step 9A the mobile terminal (UE) is activated within the coverage area of a particular NodeB, at the Femto or at the AP. The access part of the NodeB, at the Femto or at the AP communicates information from the mobile terminal to the platform 700 associated with the NodeB, at the Femto or at the AP. At step 9B the platform 700 then allocates the baseband NodeB, at the Femto or at the AP function and the RNC or BRAS (Broadband Remote Access Server) function either at access node 800 at the NodeB at the Femto or at the AP site or at the gateway 802 at the RNC or BRAS site of the network or even from neighbouring nodes that have spare resources to pull. The decision as to whether the RNC or BRAS function is allocated at the platform 700 of access node 800 or the gateway node 802 may be made depending on various criteria, including:

- The device type—for example this decision can be based on the radio access capabilities that the mobile terminal indicates upon activation, such as whether it is operating in the circuit switched or packet switched domains.
- The location of the mobile terminal. If the mobile terminal is near the edge of the cell (which can be determined by network power measurements or neighbour cell measurements from the mobile terminal, within a plus or minus 3 dB range for the RACH).
- The establishment cause of the connection request: such that the NodeB can filter the unnecessary signalling information from the mobile terminal which is not critical—for example periodic routing area update messages.

Upon allocating the baseband NodeB at the Femto or at the AP and the RNC or BRAS function, the NodeB at the Femto or at the AP may allocate the mobile terminal to a particular carrier dedicated to the RNC or BRAS function.

Once the RNC or BRAS function is allocated to either the access node 800 or the gateway 802 at step 9C, other functions performed by the platform 700 at the access node 800 (or other access node) and the gateway 802 (or other gateway) are allocated to the mobile device. All other platform functions may be provided by the platform where the RNC or BRAS function is allocated to the mobile terminal. However, a platform at a different location to that which provides the RNC or BRAS function to the mobile terminal may provide some or all other functions.

At step 9D the platform which is allocated the RNC or BRAS function is provided with a Common ID message from the core network 804.

At step 9E, this message is used by the platform 700 to look up the complete subscription information for the mobile terminal, as well as the resource requirements (QoS) of the services required and negotiated PDP context, this information being provided by the core network 804.

The subscription information relating to the device that is obtained from the central nodes (e.g, core network) 804 is used to allocate the other functions at access node 800 and/or the gateway 802 in dependence upon various factors, including:

- Detailed information regarding the mobile terminal type obtained from the core network.
- The subscription characteristics of the mobile terminal.
- The applications previously used most frequently by the mobile terminal.
- The characteristics of the applications previously used by the mobile device and the performance requirements thereof.
- The historic mobility of the mobile terminal (speed, connection, distance travelled etc).
- The location of the mobile terminal and the likely destination of traffic from the mobile terminal based on historic usage patterns.
- The load of the NodeB providing RF services to the mobile terminal, and the historic traffic trends at that NodeB at Femto or at AR
- The characteristics of the NodeB at the Femto or at the AP providing RF services (for example, the location, what other devices are connected through the NodeB at the Femto or at the AP, the number of machine to machine devices being attached and served by the NodeB, etc).

As mentioned above, a single mobile terminal may have platform functions/applications allocated on a plurality of platforms. Generally, when a mobile terminal is near-stationary it is most efficient for its functions/applications to be served from an access node 800 (i.e. distributed), whereas mobile terminals with greater mobility (or lower anticipated cell hold times) will be most efficiently served by having fewer or no functions/applications served from the access Node 800, and more or all functions/applications served from a gateway 802 (i.e. centralised). The assignment of functions/applications to a mobile terminal between an access node 800 and a gateway 802 will also depend upon the characteristics of the service type provided by the application (for example, the average IP session duration, the popularity of the particular application, the average mobility of mobile terminal using the service provided by the application etc).

Traffic management may be performed at the access node 800, where there is access to real-time radio information from the radio frequency part of the NodeB, the Femto or the AP serving the mobile device.

Centralised Radio Resource Management (RRM) may be provided at the gateway 802, and maintains performance across different access modes 800, which may have different radio access technologies, frequency bands, coverage etc. The RRM function 724 of the platform 700 of the gateway 802 may obtain information regarding radio traffic management from each access node 800 to dynamically position subscribers to particular radio technology. This technique will be used to allocate network resources based on the resource availability, application used and user mobility, For example, the traffic management information may be provided by the soft NodeB 708, Femto or AP of the platform 700 at the access node 800. This soft NodeB 708 obtains radio information relating to the mobile terminal from the radio frequency part of the NodeB to which the mobile terminal is wirelessly connected.

For a particular mobile terminal, functions provided by an access node 800 and gateway 802 may be coordinated to work together in an advantageous manner (i.e. a hybrid or distributed arrangement). For example, the gateway 802 may set operating limits or ranges within which functions performed by the access node 800 may be performed, without reference to the gateway 802. When the functions move outside the ranges set, control of those functions may be passed to the gateway 802.

Further, the access node 800 and the gateway 802 may cooperate to advantageously optimise content delivery to a mobile terminal.

Figure 8:
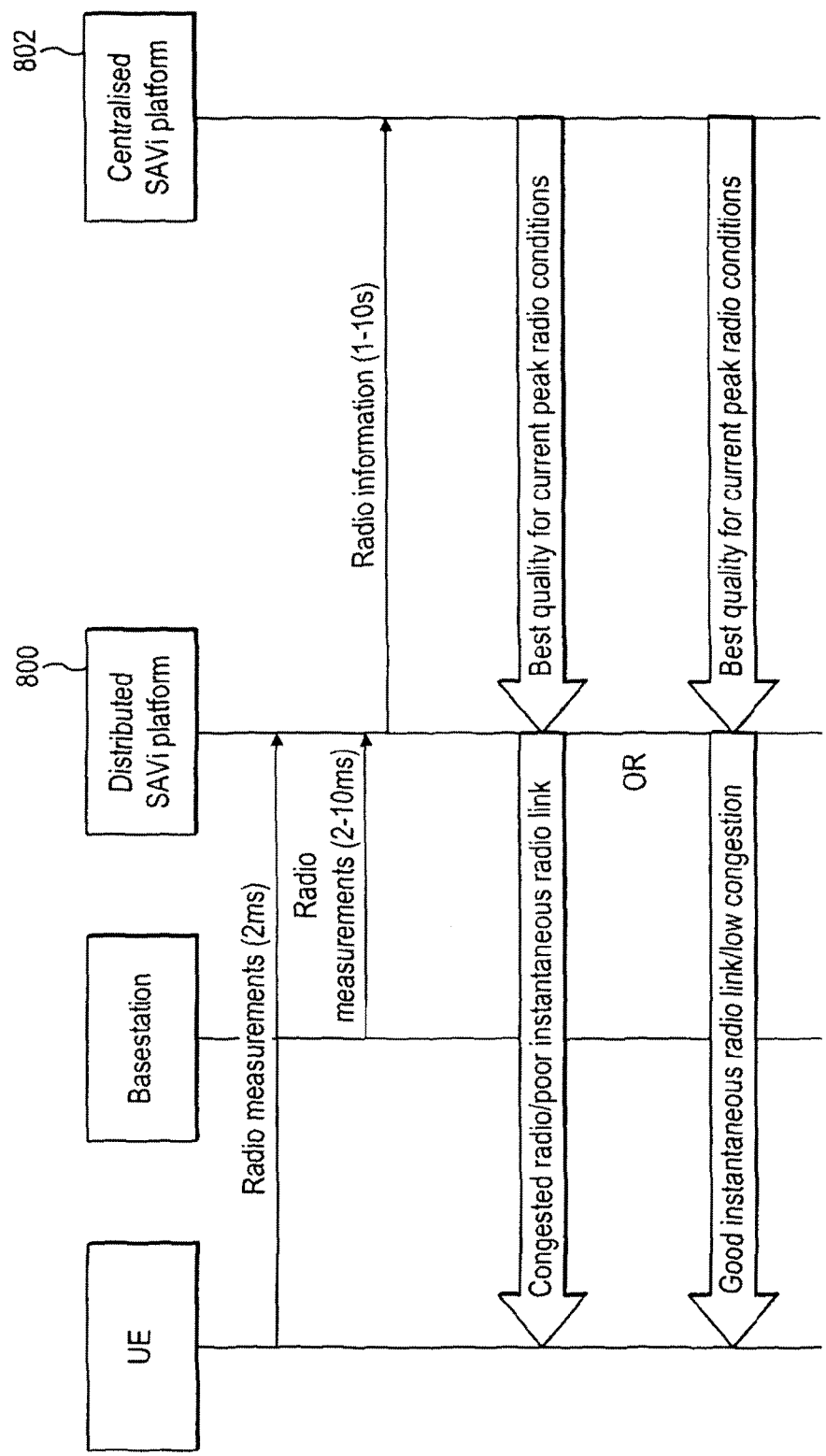
FIG. 8 shows the optimisation of content delivery to a mobile terminal.

The optimisation of content delivery will now be described with reference to FIG. 8 of the drawings. Content may be optimised at gateway 802 and at an access node 800. The gateway 802 may serve multiple access nodes 800, and my distribute content to those multiple access nodes 800, for onward transmissions from each of those access nodes 800 to a mobile terminal via the radio frequency part of NodeB, the Femto or the AP serving that node. Radio quality measurements are reported by the mobile terminal to the access node 800 at regular intervals, such as 2 millisecond intervals. Radio quality measurement relating to that mobile terminal are transmitted between the radio frequency part of the NodeB, the Femto or the AP serving the mobile terminal to the access node 800 at regular intervals, such as between 2 and 10 millisecond intervals. These radio measurements are received at the soft nodes 702 and are passed to functions 704 (e.g. to QoS function 732 for analysis). These radio frequency measurements from the mobile terminal and the NodeB are reported by the access node 800 to the gateway 802 (e.g. to QoS function 732 of the gateway 802 for analysis) at regular intervals, such as intervals of between 1 and 10 seconds. The gateway 802 may receive radio information from multiple access nodes 800. The radio measurements received by the gateway 802 may be analysed over a relatively long period, such as between 1 and 2 minutes. The radio quality measurements may be averaged (for example, the arithmetical mean of the radio quality maybe determined) over this time period. The transmission of content from the gateway 802 may then be optimised according to this calculation. Where the content is distributed by the gateway 802 to a plurality of access nodes 800, the content distribution will be based on the analysis of the radio quality indicators from all of the access nodes 800. The analysis may consider the maximum or peak radio performance over the time period of between 1 and 2 minutes.

When the content is received by each access node 800, the access node 800 then distributes the content to each mobile terminal. This distribution is optimised based on real-time network mode and mobile terminal specific radio link quality, as determined over a period of, for example, between 1 and 10 milliseconds. That is, content delivered to a mobile terminal that has high radio link quality may be optimised in a different manner to a mobile terminal that had poor radio link quality.

Figure 9:
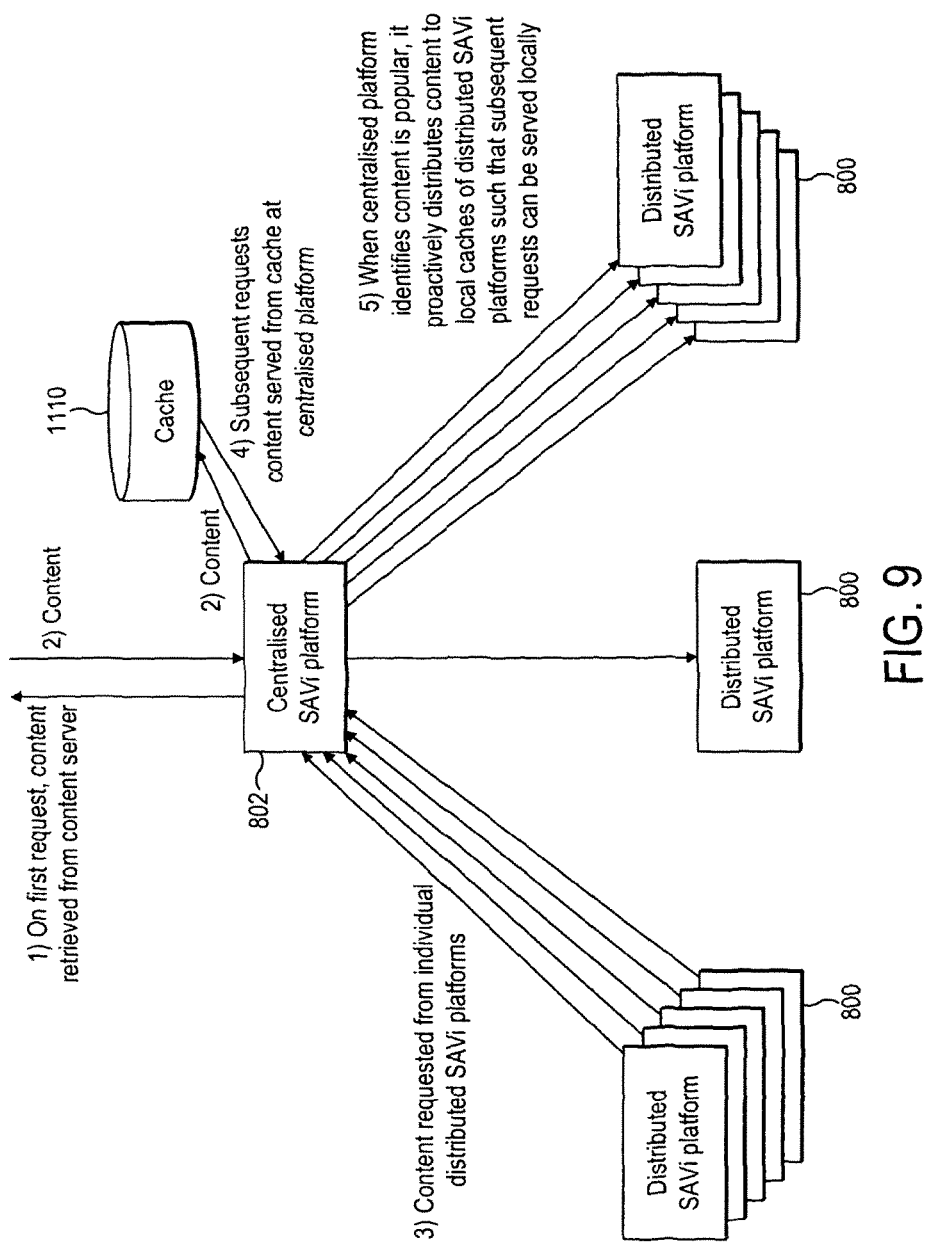
FIG. 9 shows a further optimisation of content delivery to a mobile terminal.

The co-operation between access nodes 800 and gateways 802 may further enhance the distribution of content in a manner now to be described with reference to FIG. 9.

When a mobile terminal requests a particular content item, this request is transmitted to the access node 800 serving that mobile terminal, assuming that this is the first request for this content item to the access node 800, the access node 800 passes this request to the gateway 802 serving the access node 800. Assuming that this is the first request for this content item from the gateway 802, the gateway 802 retrieves the content from a content server. The content is then provided by the content server to the gateway 802, and from there is distributed to the access node 800, and onwardly to the requesting mobile terminal. Advantageously, the gateway 802 maintains a record of content items that are requested frequently. When a content item is determined by the gateway 802 to be requested frequently, this is stored in a cache 1110 associated with the gateway 802 (which may be the cache 728 of the platform 700). Subsequent requests for that content item from access nodes 800 to the gateway 802 can then be serviced by retrieving the content item from the cache 1110 and distributing the content item to the requesting access node 800, and thus avoiding the need to request the content from the content server.

The gateway 802 may be further configured to identify popular content items that are likely to be requested by a large number of access nodes 800. When it is determined that a content item is popular, the gateway 802 may push these content items to each of the access nodes 800 associated therewith (so that this content is hosted at the access node 800, using Content Delivery Network (CDN) function 730 of the network functions 704 of the gateway 802 and the access node 800). The content is then available at the access node 800 for transmission to any mobile terminal that requests it, without having to retrieve this content from the gateway 802 or the content server. Advantageously, the distribution of such content items is performed in a manner which takes into account the capacity or the congestion of the link between the mobile terminal and the gateway 802 and the nature of the content. For example, typically a link between a mobile terminal and the gateway 802 may experience very little usage and congestion in the early hours of the morning. The content item can be advantageously transmitted in between the gateway 802 and the access node 800 at this time, when there is spare capacity. The gateway 802 will determine whether the content item is suitable for transmission on this basis, for example, by taking into account a number of times that the content item has been requested, the size of the content item and the storage space at the access node 800. If a content item is relatively small and is time-critical, such as news headlines, then such a content item may be distributed frequently throughout the day, as such content is not suitable for transmission once a day at early hours of the morning, as it becomes quickly out of date.

Relocation of Mobile Terminal

Figure 10:
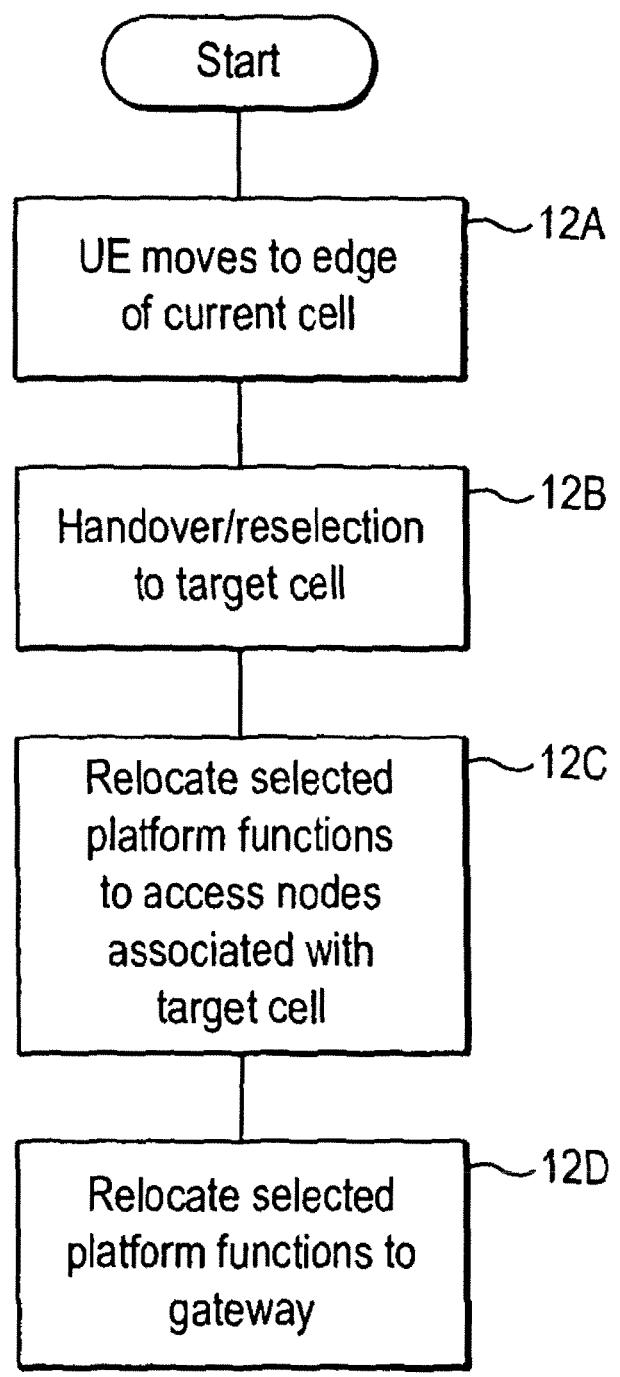
FIG. 10 is a flow chart showing the procedures performed when a mobile terminal moves within the network.

The procedures performed when a mobile terminal moves between cells in the mobile telecommunications network will now be described with reference to FIG. 10. In the conventional manner at step 12A, when the mobile terminal moves to the edge of its current serving cell, the radio measurements reported from the mobile terminal and the radio frequency part of the NodeB, the Femto or the AP serving that mobile terminal are used by the core network to determine when to perform a handover and to which target cell the handover should be performed. When the best target cell has been identified, handover to that target cell from the serving cell it is performed at 12B in a conventional manner.

At step 12C selected platform functions may be relocated from the source access node (that served the old cell) to the destination access node (that serves the new target cell).

When the source and destination access nodes are served by the same gateway, only base station function (such as soft NodeB functions 708) may be relocated to the destination access node.

The relocation of functions of the access nodes is performed independently to the radio handover, so for some time after the radio handover, the source access node continues to serve content to the mobile terminal through the destination access node. The routing of data packets for the 3G network between the destination and the source access nodes may be performed using an Iu interface between the RNC or BRAS function 712 of the destination access node and the SGSN/GGSN function 714 of the source access node. Alternatively, the routing of data packets between the destination and the source access nodes can be completed by the SGSN/GGSN function 714 of the destination access node connecting directly to functions of the source access node through an IP interface.

After handover has been completed at step 12B, the access node controlling the mobile terminal may be relocated from the source access node to the destination access node in coordination with the gateway. the standardised handover decisions (mainly based on coverage, quality, power, interference, etc.) for 2G, 3G, LTE & fixed network are used to move the mobile from one node or system to another. However, the platform 700 introduces new opportunity to make the handover decision based on type or characteristics of the certain application, type of user and the QoS requirements.

The timing of the relocation of access node functions from the source to destination platform may be dependent on the following:
- the duration of the current connection/communication of the mobile terminal
- the speed of movement of the mobile terminal
- the characteristics of the applications being used by the mobile device, the quality of service, the predicated type and amounts of transmission ongoing.
- The radio resource allocations status at the mobile terminal
- The respective node of the source and destination and access nodes.

At step 12D, optionally, some functions will be reallocated from the access nodes to the gateway. For example, if the destination access node is heavily loaded and is congested, or has a lower capability then the source access node, or the mobile terminal is determined to be very mobile, it may be advantageous to transfer functions to the gateway. Functions are reallocated from the access node to the gateway by, for example, a Serving Radio Network Subsystem (SRNS) relocation between the RNC function 712 of the access node and the gateway. Alternatively the functions may be reallocated by performing a radio reconfiguration of user connection to the mobile terminal.

The reallocation of functions from an access node to the gateway may be performed at call/communication sessions set-up. At call/communication session set-up, further subscriber information will be provided, which may be used by the access node or gateway to be determine whether it would be advantageous to reallocate functions from the access node to the gateway. Reallocation of functions from the access node 800 to the gateway 802 may be performed during an active connection when a requirement of the communication sessions has been modified, or where the required resource is not available at the access node 800.

According to the same principles, applications may be (re)located (or distributed) between access nodes 800 and for gateways 802 to provide optimised application delivery/best use of the communication resources.

As mentioned above, information about each application used by the user at the mobile terminal is stored in an application context. The application context is shared between each access node 800 and gateway 802 that control the user connection for that mobile terminal. One of the access nodes 800/gateways 802 will be the "master" for that particular application, and that will also be the master of an application specific record in the application context. The application context is advantageously periodically synchronised between the access node 800 and the gateway 802.

The application information is the application context specific to a particular mobile terminal, and this is passed between access nodes and gateways during reallocation for a mobile terminal, enabling the application to be seamlessly passed access nodes/gateways, avoiding impacts to the user experience.

Figure 11:
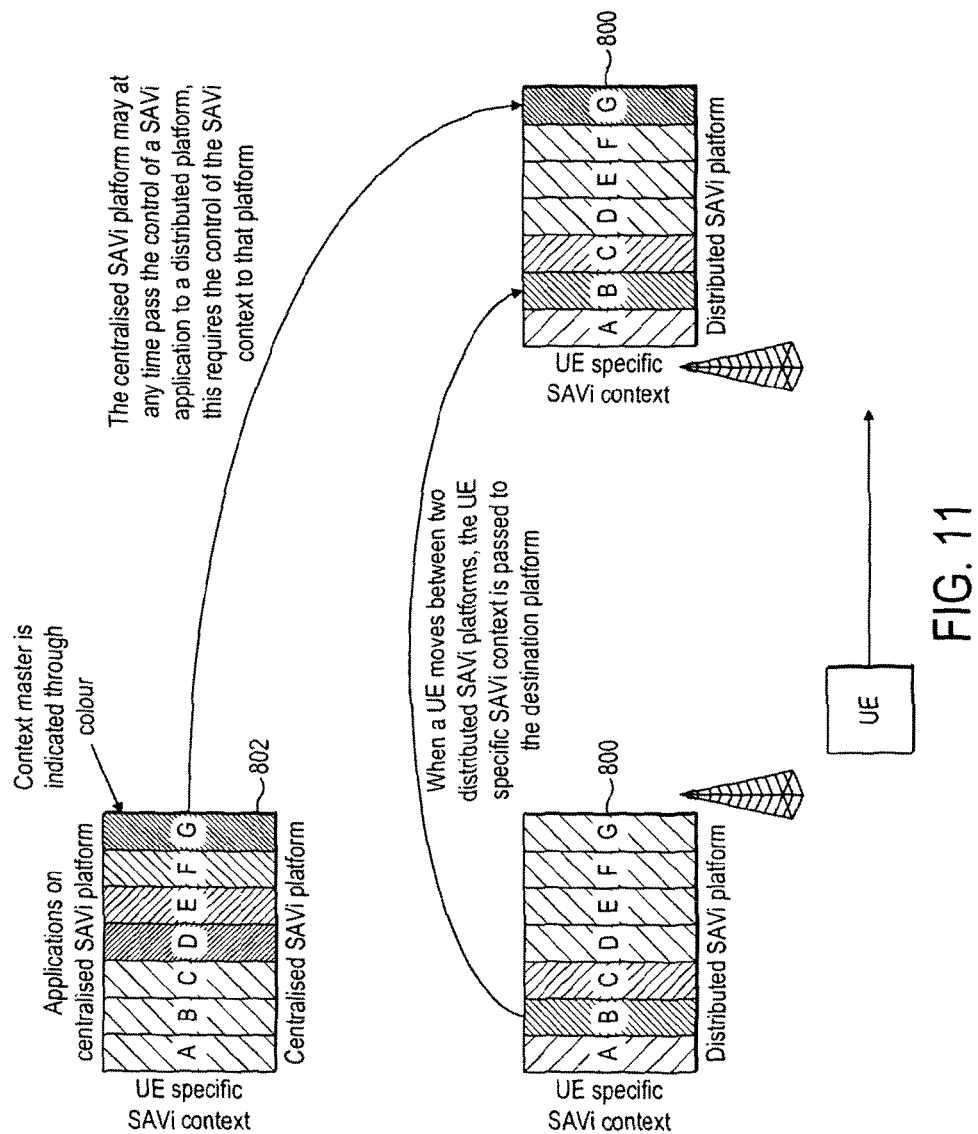
FIG. 11 shows the transfer of information between platforms.

FIG. 11 shows the transfer of application information between access nodes and gateways.

Tailoring Bandwidth to Application

Radio measurements received from the radio frequency part of the NodeB, the Femto or the AP serving the mobile terminal are passed to the soft nodes 702 of the platform 700 (of the access node 800 or gateway 802 serving the mobile terminal), and are passed to the network functions 704 of the platform 700, which then distributes the measurements to where necessary within the platform 700. The platform 700 has access to the subscriber information from the core network, which allows the network functions 704 to deliver data traffic in a manner that is optimised for radio conditions as indicated by the radio measurements. The data traffic may also be optimised according to the subscription of the user of the mobile terminal available radio resource, mobile terminal capability, and/or for the class of the terminal (e.g. access technologies used). This optimisation allows bandwidth usage to be balanced with customer experience. The subscriber information may include information about the price plan of the user of the mobile terminal. The mobile network operator may track the type of application used by the user, the total data usage of the user, and may differentially target radio resources the highest data value stream of users.

By hosting applications 740, 742 in the services part 706 of the platform the access node 800 (or at least the gateway 802), the point of the network that is aware of the application being used by the user of the mobile terminal closer in the link between the mobile terminal and the core network to the NodeB serving the mobile terminal. This enables the sharing of network resources to the most appropriate data streams, such as the most profitable data streams. Such awareness of the application to which a request for data transmission relates allows the use of low value data streams, such as peer-to-peer file sharing, to be allocated only limited bandwidth, so that remaining bandwidth can be targeted to particular users. In the uplink, transmission of data can be controlled by the access node 800 (or gateway 802) hosting the application to control data flow appropriately before data is onwardly transmitted towards the core of the network (which was not possible with conventional arrangements).

Application Programming Interface (API)

As mentioned above, a novel API is provided which defines the language that each of the software modules 740, 742 of the platform 700 use to communicate to coordinate to optimise application delivery to users. The platform 700 negotiates which each application 740, 742 the specific resource and performance requirements based on the application characteristics, allowing the application to directly communicate the scheduling performance requirements, rather than using a predefined set of quality of service parameters. This negotiation between the platform 700 and the applications 740, 742 is facilitated by the API.

The API may also facilitate the provision of radio link quality information (e.g. from QoS function 732) to applications 740, 742.

The API may further enable the platform 700 to control use of the applications 740, 742—e.g. to allow, disallow or adapt the applications.

By way of example, the application 740 may be a Voice over IP (VoIP) application. The nature of Voice over IP communications is that there is a virtually continuous succession of small data packets in which voice data is communicated. The voice data must be communicated with no or minimal latency in order that a two-way conversation can be performed successfully. The Voice over IP application 740 is able to compress voice data before transmission using a variety of techniques/CODECs. The compression techniques/CODECS may range from a relatively low compression technique, which provides high quality voice reproduction but requires a large bandwidth, to a much higher compression technique which provides reduced voice quality and which requires a much lower bandwidth.

The API is operable to provide details of the application characteristics to the network functions part 704 of the platform 700. This makes the network functions part 704 of the platform aware of the characteristics of the application. In the present example, as the application is a Voice over IP application, the network functions part 704 may be made aware that the application will tend to transmit continuous successions of small data packets that require transmission with no or low latency. The network function 704 may then be configured appropriately.

The API may further be operable to allow the network functions part 704 to communicate radio link quality information to the application 740. For example, when the network functions part 704 received information regarding the application characteristics (via the API), it may allocate radio link resources to that application 740. This allocation of radio link resources may be communicated by the network functions part 704 to the application 740 (via the API). The application 740 may then select an appropriate compression technique/CODEC in dependence upon the radio link quality available. During a Voice over IP call, the available radio link quality may be communicated regularly from the network functions part 704 to the application 740 (via the API) to allow the application 740 to vary the compression technique/CODEC used in accordance with changes to the radio link quality.

The network functions part 704 may control how the applications 740, 742 work (via the API). The network functions part 704 may allow, disallow or adapt the applications 740, 742 hosted in the services part 706 of the platform 700. For example, the network functions part 704 may require the Voice over IP application 740 to use a particular compression technique/CODEC if radio link bandwidth is restricted.

Another example of how the network functions part 704 may advantageously provide radio link quality information to an application (via the API) is when the application 742 is a gaming application used by several users. If the radio link quality information received by the application 742 indicates that bandwidth is restricted, the application 742 may adapt is communications to the users such that latency of the communications is increased uniformly for all of the users (so that they all experience the same delay), in order that each of the users is provided with the same gaming experience.

In the embodiments described, the devices that connect to the platforms 700 are mobile devices that connect to the platforms via the radio access network of a mobile/cellular telecommunications network. It should be appreciated that non-mobile (fixed) devices may be connected to the platforms 700, for example by a wired or cable connection.

Allocation of Services

The control means is responsible for allocating the service instance for each UE, based on the UE locations and the control means capacity, capability and available resources to host another instance of a service.

For certain low popularity services or where the available serving control means capacity or capability is limited, the service can be hosted from a central control means, or from a neighbouring distributed control means.

For some services/functions, where the source and destination client applications are in the same geographical region, being served by the same site (e.g. BTS location) or site cluster (e.g. finite number of sites), the access node 800/gateway 802 ensures that the server for the service is located close to both users, and the traffic is routed between the users within the site.

FEATURES OF THE EMBODIMENT

Table of Contents

1 Introduction
1.1 SAVi Platform Reference Model
1.2 Scope
2 Applications Environment
2.1 IaaS and PaaS Facilities
2.2 Applications Security
3 Applications Services Platform
3.1 Communications Services
3.1.1 Service Registry
3.1.2 Service Bus
3.1.3 Service Procedure & Data encoding
3.1.4 External Application Communications Services
3.1.5 Communications Security
3.2 Network Services
3.2.1 Network Information Services
3.2.2 Network Traffic Services
3.2.3 Network Integration Services
4 Platform O&M
5 Base Platform Requirements
5.1 Base Platform Requirements for Base Station Node
5.2 Base Platform Requirements for RNC
6 Appendix A—Network Information Service Parameters
7 References

1 INTRODUCTION

Figure 12:
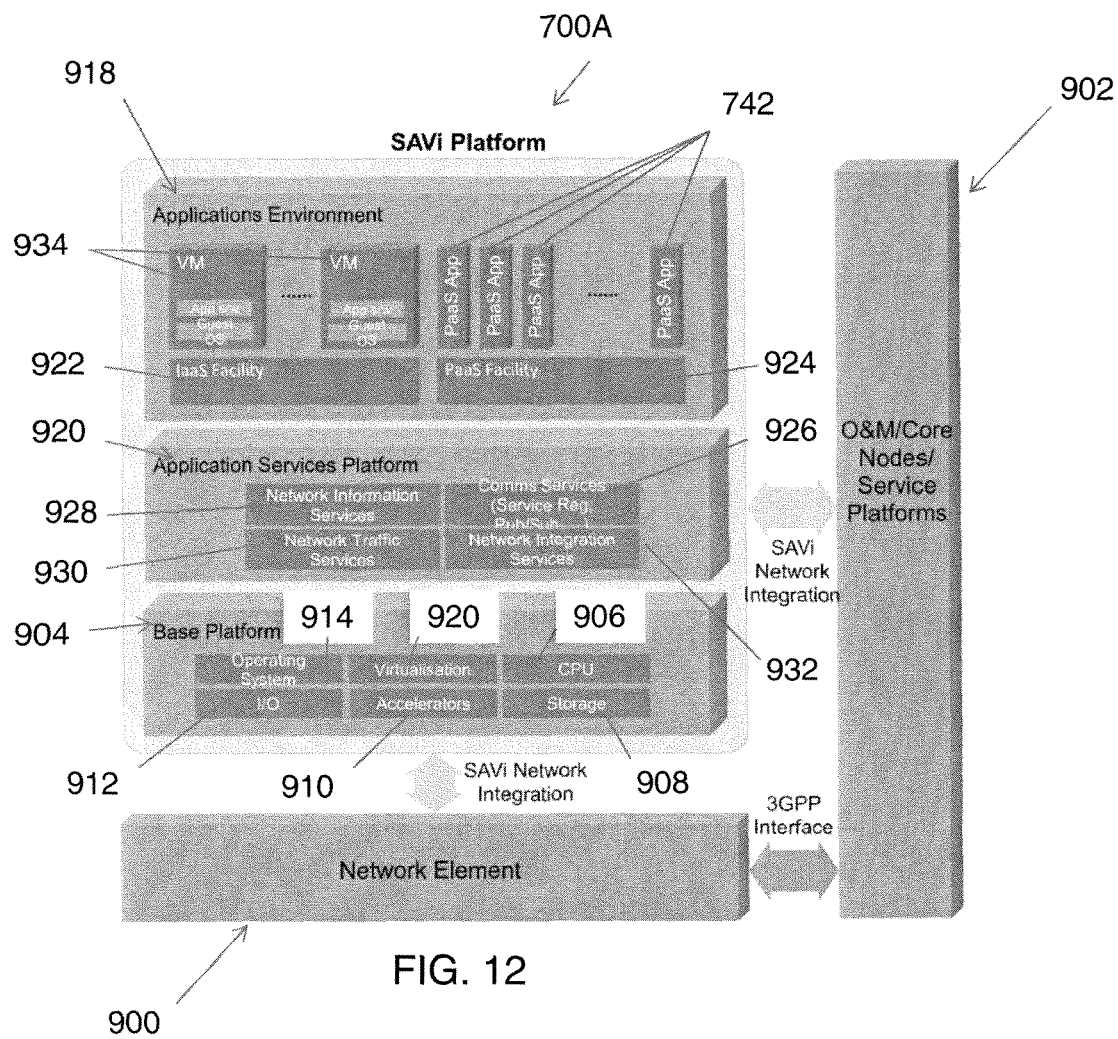
FIG. 12 shows a modified Platform Reference Model.

A modified version of the platform 700, in accordance with an embodiment of the invention, is shown in FIG. 12. An important element of the modified platform (SAVi platform) 700A is the introduction of Open Access IT Platforms in the Radio Access Network (RAN) at Base Station and RNC nodes with the ability to host $3^{rd}$ party Applications and Services which can be exposed to network traffic and information provided by the network node.

This document specifies some features of these SAVi Platforms 700A.

1.1 SAVi Platform Reference Model

The SAVi Platform 700A is integrated with a Radio Access Network (RAN) Element 900 (e.g. RNC 3; NodeB 1 or eNodeB) to provide Application services at that node and also connects to other network nodes or external platforms (e.g. Core Network Nodes, O&M Systems, Service Platforms etc.) 902 for network management and control.

A SAVi Platform 700A consists of a carrier-grade Base Platform 904 providing the hardware resources for the platform (e.g. CPU 906, Memory, Storage 908, Acceleration Devices 910, Input/Output Devices 912 etc.) together with the supporting Operating System 914 and Virtualisation (Hypervisor) software 916.

The software environment hosting Applications 742 on the SAVi Platform 700A includes the Applications Environment 918 and the Application Services Platform 920.

The Applications Environment 918 supports a flexible and efficient multi-tenancy run-time and hosting environment for Applications 742 by providing both Infrastructure as a Service (IaaS) 922 and Platform as a Service (PaaS) 924 facilities, allowing 3rd Party Application developers different degrees of control over Processing Power, Memory, Storage or Operating Systems.

The Application Services Platform 920 provides a set of middleware services to hosted applications 742 within the Applications Environment 918. Communications Services 926 provide the basic communications methods and control mechanisms allowing Applications 742 to communicate with each other, with external Applications hosted on other platforms and with the Radio Access Network Element 900. Network Traffic Services 930 and Information Services 928 provide access to Radio Access Network data traffic and measurement or state information. Network Integration Services 932 provide any required interaction with Core Network elements or functions for the purpose of Billing, Policy Control or Lawful Intercept, for example.

1.2 Scope

The software environment for the platform 700A including the SAVi Applications Environment 918 and SAVi Applications Platform 920 is described. Requirements for the Base Platform 904 are also described.

Features of Platform 700A O&M and Network integration are described provided.

The SAVi Platform 700A may be a standalone or may be part of the existing Network Element platform upgraded to support the new environment The SAVi Platform 700A features outlined in this specification relate to the following example deployment scenarios:

(a) A SAVi Platform 700A integrated with a 3G/HS (Node B) Base Station element;
(b) A SAVi Platform 700A integrated with an LTE (eNode B) Base Station element;
(c) A SAVi Platform 700A connected or integrated with a Radio Network Controller (RNC)

For the case of a SAVi Platform 700A integrated with a traditional 3G (Node B) Base Station element some additional RNC functionality may be required, either on the SAVi Platform 700A or on the Base Station Element, to support integration of the SAVi Platform 700A.

2 APPLICATIONS ENVIRONMENT

The SAVi Applications Environment 918 provides the security, packaging and run-time environment models for hosting applications on the SAVi Platform 700k To enable a flexible and efficient multi-tenancy environment for Applications 742 both Infrastructure as a Service (IaaS) 922 and Platform as a Service (PaaS) 924 facilities are provided.

2.1 IaaS and PaaS Facilities

PaaS Applications may be written using the Java programming language and run in a Java virtual machine (JVM) 934 using the Open Services Gateway Initiative (OSGI) framework [1]

A SAVi Platform 700A may have the capability to execute software within Virtual Machines, isolated from the software environment of the Network Equipment.

A virtual machine environment offering 'Full virtualisation' may be provided by Kernel-based Virtual Machine (KVM).

SAVi applications 742 may be packaged using the Open Virtualisation Format (OVF) Version 1.1.0 as specified by the DMTF [2]

2.2 Applications Security

SAVi Applications 742 may be digitally signed. Certificates of the signing entity's public key may be included in all Application packages. The Applications Environment 918 may only install SAVi Applications 742 whose signatures have been verified by the SAVi Applications Environment 918. The Applications Environment 918 may be provisioned with root keys of all Certificate Authorities it trusts for the purpose of verifying the signatures of SAVi Applications 742. The platform 700A may be configured to enable the network operator to update the list of trusted root keys in a secure manner.

The facility is also provided to revoke signed SAVi Applications 742 so that they can no longer be installed on the Applications Environment 918.

The SAVi Platform 700A may provide a trusted environment were sensitive data can be stored and where sensitive operations can be performed. The trusted environment on the SAVi Platform 700A may be based on Trusted Platform Module (TPM) technology.

Keys used to verify SAVi Applications 742 may be stored in the trusted environment on the SAVi Platform 700A, and the verification process may be performed in the trusted environment on the SAVi Platform 700A.

An authorisation framework for SAVi Applications 742 is provided.

3 APPLICATIONS SERVICES PLATFORM

The SAVi Application Services Platform 920 provides a basic defined set of middleware Services to Applications 742 hosted in the SAVi Application Environment 918 allowing Communications Services, Network Traffic and Information Services and Network Integration Services.

SAVi applications 742 may interact with each other and with the network as software services following the principles of a Service Oriented Architecture (SOA) moderated and simplified as appropriate for the network environment.

3.1 Communications Services

Communications Services 926 are methods and control mechanisms used for communications between Applications 742 hosted on the SAVi Platform 700A and Network Services offered by the Application Services Platform 920. The Communication Services 926 provide lightweight, low overhead communications services allowing flexible, efficient communications between Applications 742 and Network Services offered by the Application Platform 920.

3.1.1 Service Registry

A Service Registry (e.g. in the Communications Services 926) defines the services available on the platform 700A and is used by Applications 742 to locate the service endpoints for services they require and publish their own service endpoints for other Applications to use.

A SAVi Platform 700A may provide a Service Registry enabling SAVi Applications 742 to locate the service endpoints with which they will interact and how they will interact (e.g. which variant of the communications service), and SAVi Applications 720 to register service endpoints in the Service Registry.

The Service Registry protocol may follow a RESTful architectural pattern.

The Service Registry may use the ATOM Publishing protocol as specified by IETF RFC 5023 [3].

The address of the Service Registry may be provided to IaaS and PaaS Applications 742 hosted on the SAVi Applications Environment 918.

The address of the service registry may be provided to applications 742 using the OVF environment file specified by the OVF 1.1 specification.

Service Records describing the Services offered or available through the Service Registry may be encoded using JavaScript Object Notation (JSON).

3.1.2 Service Bus

The SAVi Application Services Platform 920 may be capable of facilitating interaction and communications between SAVi Applications 742 through support of two communication patterns: Publish/Subscribe and Representational State Transfer (REST). This Communications facility is termed the SAVi Service Bus.

3.1.2.1 Publish/Subscribe

A Broker-based Publish/Subscribe messaging mechanism may be used to facilitate the distribution of information on a "one-to-many" basis between Applications 742, and between Applications and Network Services provided by the platform. This mechanism allows Services or Applications 742 to publish information on certain defined subjects or topics to a Broker which distributes this information to other Applications that have subscribed, with the Broker, to receive information on the subject. The Broker manages the topics and subscription lists for each topic and is responsible for publishing subscribed data to the relevant subscribers The SAVi Applications Services Platform 920 may provide a Broker-based Publish/Subscribe messaging mechanism for managing and controlling the distribution of data between Applications 742 based on topics.

The SAVi Applications Services Platform 920 may ensure a non-blocking service environment in the case of malicious/spamming or misbehaving Applications 742 generating unreasonably high quantities of information to other Applications or Services provided by the SAVi Applications Services Platform 920.

The Publish/Subscribe functionality may be provided implemented using the MQTT protocol[4]:

3.1.2.2 REST based Point-to-Point Communications

A Point-to-Point messaging mechanism is provided to facilitate direct communications between Applications 742 on the platform 700A, or between Applications and Services provided by the SAVi Application Services Platform 920.

The SAVi Applications Platform 918 may provide a RESTful "Point-to-Point" communications method for pulling data from and pushing data to Application service endpoints. Applications may use REST to request data from or submit data to a service.

3.1.3 Service Procedure & Data Encoding

Only certain data formats may be permitted for messages sent between SAVi Applications 742, and between SAVi Applications 742 and Network Services provided by the SAVi Application Services Platform 920.

For communication between SAVi Applications 742, Java Script Object Notation (JSON) may be used as specified in IETF RFC 4627.

For communication between SAVi Applications 742, Extensible Markup Language (XML) may be used.

SAVi Applications 742 preferably use only one communication format, but may use more than one format.

For communication between SAVi Applications 742 and Network Services, JSON or ASN.1 may be used. In cases where the 3GPP specifications already define a native data format, that encoding may be used directly as is.

For communication between SAVi Applications 742 and Network Services 928, 930, Extensible Markup Language (XML) may be used. For Publish/Subscribe functionality, each topic may only have one associated data format.

3.1.4 External Application Communications Services

Applications 742 running on the SAVi Platform 700A may have a distributed nature requiring them to communicate with an auxiliary application running outside the SAVi Platform 700A. For example a local data optimisation application may require connectivity with a central Optimisation function running on an existing Mobile Service Platform in the Core Network. To support this and other similar service scenarios the Communications Services function 926 may need to provide controlled communications facilities with external Applications running on other service platforms.

The SAVi Platform 700A may be capable of providing each SAVi Application 742 with IP connectivity to one or more external Applications running outside the SAVi Platform 700A.

The SAVi Platform 700A may be capable of being configured by the operator to only allow certain SAVi Applications 742 to have IP connectivity.

The SAVi Platform 700A may provide a statefull firewall capability for each SAVi Application 742.

The Communications Services 926 allowing communications with external or auxiliary Applications may be based on the Communications methods outlined in sub-clause 3.2.2

3.1.5 Communications Security

This section describes the Security framework for the communications services described in the previous subsections.

Security may be provided for all communications between Applications 742, and between Applications and the Service Registry using certificate-based Transport Layer Security (TLS) as specified by the IETF in RFC 5246.1

The Service Registry and all Applications 742 should be provisioned with an X.509 certificate proving their identity for the purposes of TLS communications. These certificates may be signed by a Certificate Authorities trusted by all communication endpoints in the system.

The SAVi Platform 700A may be provisioned with root keys of all Certificate Authorities it trusts for the purpose of TLS communications.

Keys used to establish TLS communications may be stored in the trusted environment on the SAVi Platform 700A, and the TLS handshake process may be performed in the trusted environment on the SAVi Platform 700A.

The X.509 certificates of the Service Registry and of SAVi Applications 742 may be revoked so that they can no longer be used for TLS communications.

An authorisation framework for TLS communications between SAVi applications 742 is also provided.

Security may be provided for all communications with external Applications hosted on other service Platforms using certificate-based Transport Layer Security (TLS) as specified by the IETF in RFC 5246.1 in line with the requirements described above.

The Service Registry may be capable of selectively restricting which applications 742 can register services within service registry.

The Service Registry described in sub-clause 3.2.1, may be capable of tailoring or customising the response to queries by certain applications to a subset of the available services or applications.

The Service Registry may be capable of being operator configurable with respect to registration of services and the customisation of responses.

The Publish/Subscribe functionality may support Authorisation of Subscribers and Publishers towards the Broker.

3.2 Network Services

Network Services connect Applications on the SAVi Platform 700A to the Network Element 900 through a defined set of information services.

3.2.1 Network Information Services

Network Information Services 928 expose information about the UEs and the Radio Access Network element, including basic measurements taken by the network element 900 or measurements received by the Network Element 900 from connected UEs, to local applications running on SAVi Platform 700A or external Applications and Services running outside the Platform 700A.

A basic set of measurements are specified for 3G and LTE, are provided by the Network Element 900 to the Network Information Services function 928, allowing hosted Applications 742 to derive information about the state of a cell (e.g. cell load/congestion) or the state of individual UEs (e.g. location) served by the Network Element 900. The Platform 700A may also provide a facility allowing the Operator to define and derive additional parameters based on these basic measurements which can be exposed to Applications on or off-platform. For example, the Operator can define a Cell Load parameter for LTE based on a specific combination of RB Utilisation and Average Cell throughput measurements.

The Network Information Services function 928 also exposes any existing recorded network event information and counters for Cells and UEs served and managed by the Network Element 900 over a particular reporting period (e.g. number of incoming/outgoing handovers for a cell, number of Radio Access Bearers per site per 15 mins). The SAVi Node 700A is informed of any other Network IDs used by the Network Element 900 to reference a specific UE, e.g. IMSI, IMEI, GUTI, P-TMSI.

Each UE is referenced by a SAVI UE Binding ID which is known by the Network Element 900 and the SAVi Platform 700A. This Binding ID is maintained for the duration that the 3GPP UE Context is known by the Network Element 900. The 3GPP UE Context is the logical store of all information relating to the UE, the UE capability and any established bearers within the Network Element 900.

The Network Element 900 may provide the Network Information Services function on the SAVi Platform 700A with an indication that a UE has become Active on the Network Element 900 (e.g. transitioned from Idle to Active state or been handed into a cell controlled by the Network Element) or an existing UE has left the Network Element 900 within 50 ms of the event occurring.

The Network Element 900 may provide the Network Information Services function 928 on the SAVi Platform 700A with the 3GPP UE Context, including the UE temporary ID (e.g. TMSI) and the UE permanent ID (e.g. IMSI) when available within 50 ms of receiving it or any changes to the 3GPP UE Context occurring (e.g. IMSI being received in the Common ID message in the case of 3G).

The Network Element 900 may provide the Network Information Services 928 function with QoS parameters for all established Radio Access Bearers indexed by the UE identity (SAVi UE Binding ID) and Cell Identity for the RAB.

The Network Element 900 may provide the Network Information Services function 928 with the minimum set of performance measurements specified in Appendix A (Tables A1-A5).

The reporting period for the measurements specified in Appendix A may be configurable by the network operator with a minimum reporting period as indicated in Tables A1-A5.

The Network Element 900 may provide the Network Information Services function 928 with the configured Cell Identity (Cell ID) and the UE identity (IMSI) for the Cell-related and UE-related measurements specified in Appendix A (Tables A2-A6), respectively. The measurements may also be date and time stamped.

The SAVi Applications Platform may provide a facility allowing the Operator to define and derive additional parameters based on the basic measurements specified in Appendix A which can be exposed to Applications on or off-platform.

Additional UE or Cell related measurements may be provided by the Network Element 900 to the Network Information Services functions 928, including the reporting period for these measurements.

A minimum reporting period of each measurement parameter may be set, based on a view on intended use of applications, e.g. for Content optimisation.

Network event information may be provided by the Network Element 900 to the Network Information Services function 928 relating to UEs or Cells served and managed by the Network Element 900, including the reporting period for these events.

Network information services may be exposed to Applications 742 on the SAVi Platform 700A using the Communications Services described in sub-clause 3.2.

The SAVi Platform 700A may be capable of exposing local Network information services to external Applications or Services outside the SAVi Platform 700A using the External Communications Services.

3.2.2 Network Traffic Services

Network Traffic Services 930 provide routing and priority of IP traffic streams associated with a UE from the Network Element 900 to one or more Applications 742 running on the SAVi Platform 700A, and back to Network Element 900 according to the specific formats and conditions explained below.

To support the availability of UE traffic streams provided by the Network Element 900 to the Network Traffic Services function 930 on the SAVi Platform 700A a corresponding routing function is provided on the Network Element 900 to control the routing of all UE data onto the SAVi Platform 700A as required by the Network Traffic Services function 930.

The Network Traffic Services function 930 also provides the relevant Mobility functions required when a UE moves from one Network Element 900 to another with a different physical SAVi Platform 700A and continuity of local Service and Application data hosted on the SAVi Platform 700As is required.

Full mobility of UEs may not be required for early deployment phases as other end-to-end solutions may be available, or only Applications not requiring system mobility services (e.g. Services allowing Application layer continuity) may be deployed. However, it is advantageous for the Platform and overall network architecture to provide Mobility functions to efficiently support service requirements and capabilities with a full scale network deployment of SAVi platforms 700A.

The Network Traffic Services function 930 may be capable of controlling the routing function in the Network Element 900 such that User Traffic of only certain UEs is passed to the Network Traffic Service 930.

The Network Traffic Services function 930 be capable of controlling the routing function in the Network Element 900 such that only certain types of traffic of only certain UEs is passed to the Network Traffic Service 930.

The Network Traffic Services 930 may be capable of supporting plain end-to-end IP communications from the Network Element 900 to one or more Applications 742 running on SAVi Platform 700A, and traffic from Applications back 742 to Network Element 900.

The Network Traffic Services 930 may be capable of supporting GTP-U encapsulated (as defined in, e.g. see 3GPP TS 29.281) communications from the Network Element 900 to one or more Applications 742 running on SAVi Platform 700A, and traffic from Applications 742 back to Network Element 900.

The SAVi Platform 700A may be capable of supporting simultaneous communication of a UE to services provided by Applications 742 in SAVi Platform 700A as well as communication to other services in Internet or in other IP networks that are connected to GPRS or EPS.

Network Traffic Services 930 may be provided to Applications in two ways:
1) Pass-through Mode where data is passed to the Application, modified in some way and re-inserted back into the network service bearer, or
2) End-point Mode where data is passed to the Application and terminated by that Application.

The Network Traffic Services function 930 may be able to route individual established Radio Access Bearers and the Traffic/Service Flows within these bearers to Applications 742 on the Platform 700A.

Parameters may be used by the Network traffic Services 930 routing function to identify and route individual RABs and Traffic/Service Flows to Applications 742 on the Platform (e.g. UE ID, Protocol type, Application type etc.) within the SAVi Platform 700A.

The Network Traffic Services function 930 may provide an operator-configurable packet marking capability enabling the prioritisation of information from particular Applications 742 within the Network Element's Scheduling or Queuing functionality.

The Network Element 900 may provide the functionality to interpret the packet marking from the Network Traffic Services function 930 and prioritise packets on the Radio and Transport from Applications 742 accordingly.

Mobility services may be provided for 3G/HS and LTE when a UE moves from one Network Element 900 to another with different physical SAVi Platforms 700A and continuity of local Service and Application data hosted on the SAVi Platforms 700A is required, including any changes to the overall network architecture.

3.2.3 Network Integration Services

The Network Integration Services 932 on the SAVi Application Platform 920 may provide integration with existing Core Network control functionality relating to Policy Control (PCRF), Off-line and On-line Charging Systems, Lawful Intercept (LI) etc. The overall end-to-end solution supporting these network integration services may potentially involve the introduction of new network nodes (e.g. gateways) as well as, or, as opposed to, changes to existing nodes.

Full or even partial network integration services may not be required for early deployment phases as other end-to-end solutions may be available or only applications not requiring these services may be deployed; however, it is advantageous that the Platform and overall network architecture integrates efficiently to support service requirements and capabilities with a full scale network deployment of SAVi platforms 700A.

The Network Integration Services 932 may be made available on the SAVi Platform 700A and the overall end-to-end architecture supporting these services including communications protocols and interfaces with any new or existing network nodes/functionality whilst minimising impact to 3GPP specifications.

4 PLATFORM O&M

An O&M system for the SAVi Platform 700A may be provided allowing at least Performance Management, Configuration Management & Fault Management for the platform.

The O&M system for the Platform 700A may be an extension of the O&M system for the Network Element 900 to which the Platform 700A is connected.

It may be possible for the Operator to remotely install, uninstall, start, stop, upgrade and manage the lifecycle of SAVi Applications 742 separately from the software lifecycle of the Network Element 900.

It may be possible for the Operator to locally install, uninstall, start, stop, upgrade and manage the lifecycle of SAVi Applications 742 separately from the software lifecycle of the Network for early Limited Availability (LA) equipment which can be used for Trials or other limited deployment scenarios Lifecycle management of SAVi Applications 742 hosted on the SAVi Platform 700A and the resources they use may be under full Operator control and may use the emerging cloud management standards specified by the DMTF Cloud Infrastructure Management Interface [4]

5 BASE PLATFORM REQUIREMENTS

This section outlines a minimum set of hardware and Operating System related requirements for a SAVi Base Platform 700A configuration supporting the deployment scenarios outlined in sub-clause 1.2, namely:
(a) A SAVi Platform 700A integrated with a 3G/HS (Node B) Base Station element;
(b) A SAVi Platform 700A integrated with an LTE (eNode B) Base Station element;
(c) A SAVi Platform 700A connected or integrated with a Radio Network Controller (RNC)

Base Platform Requirements for Base Station Node

The SAVi Base Platform 700A configurations for connection or integration with a 3G/HS and/or LTE Base station element should support the minimum capability requirements outlined in Table 1.

TABLE 1

Minimum Base Platform Capability Requirements for a Base Station SAVi Platform 700A

| | |
|---|---|
| Processor Architecture | x86/x86-64 |
| | Including hardware assists for virtualisation |
| Operating System | Linux kernel, version 2.6.20 or above. |
| | KVM Support |
| | Red-hat distribution |
| Memory | n x 4GB DDR3 DIMM, where n = 1-6 |
| Storage | 128, 246 or 512 GB SSD, SATA II connected |
| BS Installation Options | Indoor installation |
| | Outdoor installation |
| | Cabinet Installation (19" Rack mount) |
| | Integrated BBU Board installation |
| Power Supply Options | 230 V AC or −48 V DC |
| Connectivity | Min 2 x GE connection (1 x Optical + 1 x Electrical) |

A full hardware specification may be provided for each hardware configuration supporting connection or integration with a 3G/HS and/or LTE Base station element based on the capability options outlined in Table 1 (where compliant) or for any other proposed configurations based on alternative requirements or options considered. The specification for each hardware configuration may include in addition to those outlined in Table 1:
Processor Type & Performance
Physical dimensions (W×H×D)
Weight
Power Consumption
Temperature range
Cooling requirements The SAVi Platform 700A may be 'Single RAN' capable of providing concurrent 3G/HS and LTE services to either:
  (a) Separately connected 3G and LTE Base Station Baseband Units (BBUs)
  (b) A connected 'Single RAN' BBU operating concurrently in both technology modes (3G/HS & LTE)

The SAVi Platform 700A may provide a 'fail-to-wire' bypass mechanism allowing normal network services to be provided by the Network Element 900 when a platform failure is detected or the platform is powered down 5.1 Base Platform Requirements for RNC A full hardware specification is provided for each hardware configuration supporting connection or integration with a Radio Network Controller (RNC). The specification for each hardware configuration may include in addition to those outlined in Table 1:
  Processor Type & Performance
  Physical dimensions (W×H×D)
  Weight
  Power Consumption
  Temperature range
  Cooling requirements The SAVi Platform 700A may provide a 'fail-to-wire' bypass mechanism allowing normal network services to be provided by the Network Element 900 when a platform failure is detected or the platform is powered down.

6 APPENDIX A—NETWORK INFORMATION SERVICE PARAMETERS

TABLE A1

SAVi UE Context Information.

| Parameter | Unit | Value/Range | Comment |
|---|---|---|---|
| SAVi UE Binding ID | — | Long | Identify allocated by the Network Element 900 for the UE to be used in all communications with the SAVi Platform 700A |
| P-TMSI/GUTI/... | — | Long | |
| S-RNTI, D-RNTI | — | Long | |
| IMEI (TAC, SNR & SVN) | — | Long | Defined in 3GPP TS 23.003 |
| 3GPP UE Radio Access Capability | — | String | |
| RRC State Indication | — | Idle/Active | Indication of RRC State |
| 3GPP UE Context Information | — | Structure | Information structure containing all context information available relating to the UE in the Access Platform |

TABLE A2

LTE Cell Performance Measurements.

| Parameter | Unit | Value/Range | Min. Reporting Period | Comment |
|---|---|---|---|---|
| Resource Block Utilisation (UL & DL) | % | Integer (0, 10, 20 ... 100) | | Expressed as a % of max no. of RBs for the configured cell bandwidth |
| No. of RRC Connected Users for each Customer Class | — | Integer (0, 1, 2 ... 100) | | Average over reporting period |
| Average Scheduled UEs for each Customer Class (UL & DL) | — | Integer (0, 1, 2 ... 100) | | Ave. number of UEs in MAC scheduling queue |
| Average TX Power (DL) | % | Integer (10, 20 ... 100) | | Expressed as a % of max configured Cell TX power |
| Average Cell Throughput (UL & DL) per defined Traffic Flow (i.e. QCI) | Mb/s | (0, 0.5, 1, 1.5 ... 100) | | Average over reporting period |
| Average Scheduled UEs (UL & DL) per defined Traffic Flow (i.e. QCI) | — | Integer (0, 1, 2 ... 100) | | |
| Average Packet delay in Buffer per defined Traffic Flow (i.e. QCI) | | Integer (0, 1, 2 ... 1000 ms) | | Average over reporting period |

TABLE A3

3G Cell Performance Measurements.

| Parameter | Unit | Value/Range | Min. Reporting Period | Comment |
|---|---|---|---|---|
| Average HS Code Utilisation (DL) | % | Integer (0, 10, 20 . . . 100) | | Expressed as a % of max no. of codes configured for HS traffic |
| No. of RRC Connected Users per Customer Class | — | Integer (0, 1, 2 . . . 100) | | |
| Average Scheduled UEs (UL & DL) per SPI | — | Integer (0, 1, 2 . . . 100) | | Ave. number of UEs in MAC Scheduling queue |
| Average TX Power (DL) | % | Integer (0, 10, 20 . . . 100) | | Expressed as a percentage of configured max TX power |
| Average HS Throughput per SPI (UL & DL) | Mb/s | (0, 0.5, 1, 1.5 . . . 100) | | |
| Average Total Received Wideband Power (UL) | dBm | Integer (−112, −111, . . . −50 dBm) | | |

TABLE A4

LTE UE Performance Measurements.

| Parameter | Unit | Value/Range | Min. Reporting Period | Comment |
|---|---|---|---|---|
| Average Bearer Throughput per QCI (UL & DL) | Mb/s | (0, 0.5, 1, 1.5 . . . 100) | | |
| Serving Cell RSRP (DL) | — | Integer (0 . . . 97) | | Range and mapping as specified in 3GPP |
| Serving Cell RSRQ (DL) | — | Integer (0 . . . 34) | | Range and mapping as specified in 3GPP |
| Neighbour Cell RSRP (DL) | — | Integer (0 . . . 97) | | Value provided for each reported neighbour cell. Range and mapping as specified in 3GPP |
| Neighbour Cell RSRQ (DL) | — | Integer (0 . . . 34) | | Range and mapping as specified in 3GPP |
| Average CQI (UL & DL) | — | Integer (0 . . . 30) | | Reported CQI for downlink |
| TX Power (UL) | — | Integer (0 . . . 32) | | |

TABLE A5

3G UE Performance Measurements.

| Parameter | Unit | Value/Range | Min. Reporting Period | Comment |
|---|---|---|---|---|
| Average HS Bearer Throughput per SPI (UL & DL) | Mb/s | (0, 0.5, 1, 1.5 . . . 100) | | |
| Serving Cell RSCP (DL) | — | Integer (0 . . . 127) | | Range and mapping as specified in 3GPP |
| Serving Cell Ec/No (DL) | — | Integer (0 . . . 63) | | Range and mapping as specified in 3GPP |
| Neighbour Cell RSCP (DL) | — | Integer (0 . . . 127) | | Value provided for each reported neighbour cell. Range and mapping as specified in 3GPP |
| Neighbour Cell Ec/No (DL) | — | Integer (0 . . . 63) | | Value provided for each reported neighbour cell. Range and mapping as specified in 3GPP |
| Average CQI (UL & DL) | — | Integer (0 . . . 30) | | Reported CQI for downlink. Range and mapping as specified in 3GPP |
| TX Power (UL) | — | Integer (0 . . . 32) | | |

TABLE A6

Transmission Performance Measurements

| Parameter | Unit | Value/Range | Min. Reporting Period | Comment |
|---|---|---|---|---|
| Average BS Transmission Utilisation (UL & DL) | % | Integer (0, 10, 20 . . . 100) | | Average UL & DL user plane throughput for BS is measured and expressed as a % of the max. available transmission bandwidth. The max. available transmission bandwidth is a configurable input parameter set by the operator |

7 REFERENCES

[1] OSGi Specifications, www.osgi.org
[2] Open Virtualisation Format (OVF) Specification Version 1.1, www.dmtf.org

[3] The ATOM Publishing Protocol, IETF RFC 5023, www.ietf.org
[4] MQTT v3.1 Specification, www.mqtt.org
[5] DMTF Cloud Infrastructure Management, www.dmtf.org/standards/cloud.

These documents are fully incorporated herein by reference.

The invention claimed is:

1. A mobile telecommunications network, including:
   a core;
   a Radio Access Network (RAN) having radio means for wireless communication with mobile terminals registered with the mobile telecommunications network, the RAN comprising a Node B and a Radio Network Controller (RNC); and
   a platform control unit that is configured to:
      host a plurality of applications at an application layer of the platform control unit;
      provide network traffic services for a subset of user traffic of the mobile telecommunications network, the subset of user traffic being determined based on at least one of a user traffic type and a mobile terminal associated with user traffic, wherein the network traffic services are configured to cause the subset of user traffic to be routed from the RAN to at least one of the plurality of hosted applications and from the at least one of the plurality of hosted applications back to the RAN;
      operate a broker mechanism that controls distribution of data between at least some of the plurality of applications, wherein distributing the data is based on (1) a determined topic associated with the data and (2) an identified subscription that each of the at least some of the plurality of applications has with the broker mechanism, and
      expose operational information about the RAN to the plurality of applications, wherein the operational information is collected over a reporting period that is set based on a determined intended use of the operational information by the plurality of applications.

2. The mobile telecommunications network of claim 1, wherein the radio access network includes one or more elements, the one or more elements using a plurality of identifiers to refer to the mobile terminal.

3. The mobile telecommunications network of claim 1, wherein the platform control unit is operable to receive information relating to the mobile terminal from the radio access network when the mobile terminal becomes active.

4. The mobile telecommunications network of claim 1, wherein the platform control unit includes an operations and maintenance function.

5. The mobile telecommunications network of claim 4, wherein the operations and maintenance function is related to an operations and maintenance function of at least one element of the radio access network.

6. The mobile telecommunications network of claim 1, wherein the platform control unit is operable to control a routing of mobile terminal traffic in dependence upon a type of the mobile terminal traffic.

7. The mobile telecommunications network of claim 1, wherein the platform control unit is operable to host the at least one of the plurality of hosted applications and includes means operable to support simultaneous communication of the mobile terminal with the at least one of the plurality of hosted applications and with another destination.

8. The mobile telecommunications network of claim 1, wherein the platform control unit is operable to host the at least one of the plurality of hosted applications and includes data transfer means operable to pass data from a source to the at least one of the plurality of hosted applications for processing, and wherein, if the at least one of the plurality of hosted applications generates response data, the transfer means is operable to send the response data to the source.

9. The mobile telecommunications network of claim 1, wherein the platform control unit is operable to make data packets relating to a first hosted application included among the plurality of hosted applications distinguishable from data packets relating to a second hosted application included among the plurality of hosted applications.

10. A method for determining a network path of a communication, the method being implemented by a platform control unit of a mobile telecommunications network that includes a core and a Radio Access Network (RAN) both comprising a Node B and a Radio Network Controller (RNC) and having radio means for wireless communication with mobile terminals registered with the network, the platform control unit being located at either the Node B or the RNC, the method comprising:
   via the platform control unit:
      host a plurality of applications at an application layer of the platform control unit;
      provide network traffic services for a subset of user traffic of the mobile telecommunications network, the subset of user traffic being determined based on at least one of a user traffic type and a mobile terminal associated with user traffic, wherein the network traffic services are configured to cause the subset of user traffic to be routed from the RAN to at least one of the plurality of hosted applications and from the at least one of the plurality of hosted applications back to the RAN;
      operate a broker mechanism that controls distribution of data between at least some of the plurality of applications, wherein distributing the data is based on (1) a determined topic associated with the data and (2) an identified subscription that each of the at least some of the plurality of applications has with the broker mechanism; and
      expose operational information about the RAN to the plurality of applications, wherein the operational information is collected over a reporting period that is set based on a determined intended use of the operational information by the plurality of applications.

11. The method of claim 10, wherein the platform control unit verifies a signature of the at least one of the plurality of hosted applications.

12. The method of claim 10, wherein the platform control unit includes a trusted area that is configured to store a key used to verify a signature of the at least one of the plurality of hosted applications that is useable to verify the at least one of the plurality of hosted applications.

13. The method of claim 10, wherein the platform control unit supports simultaneous communication of the mobile terminal with the at least one of the plurality of hosted applications and with another destination.

14. The method of claim 10, wherein the platform control unit includes data transfer means operable to pass data from a source to one of the plurality of hosted applications for processing, and wherein, if the at least one of the plurality of hosted applications generates response data, the transfer means is operable to send the response data to the source.

15. The method of claim 10, wherein the platform control unit is configured to identify individual radio access bearers, or portions thereof, relating to the at least one of the plurality of hosted applications.

16. The method of claim 10, wherein the platform control unit includes means for making data packets relating to a first application included in the plurality of hosted applications distinguishable from data packets relating to a second application included in the plurality of hosted applications.

17. The method of claim 16, including means operable to prioritize the distinguishable data packets.

18. The method of claim 10, wherein the platform control unit includes an operations and maintenance function.

19. The method of claim 10, wherein at least one of the plurality of hosted application is executed within a virtual machine environment of the platform control unit.

20. The method of claim 10, wherein the platform control unit supports simultaneous communication from mobile terminals to multiple hosted applications included in the plurality of hosted application.

21. The mobile telecommunications network of claim 1, wherein the platform control unit is configured to expose local network information services to applications or services that are external to the platform control unit.

* * * * *